(12) United States Patent
Ogiwara et al.

(10) Patent No.: US 9,309,138 B2
(45) Date of Patent: Apr. 12, 2016

(54) FRESH WATER PRODUCTION METHOD

(75) Inventors: Wakako Ogiwara, Otsu (JP); Hiroo Takabatake, Otsu (JP); Masahide Taniguchi, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 593 days.

(21) Appl. No.: 13/391,347

(22) PCT Filed: May 20, 2010

(86) PCT No.: PCT/JP2010/058524
§ 371 (c)(1),
(2), (4) Date: Feb. 20, 2012

(87) PCT Pub. No.: WO2011/021415
PCT Pub. Date: Feb. 24, 2011

(65) Prior Publication Data
US 2012/0145630 A1    Jun. 14, 2012

(30) Foreign Application Priority Data

Aug. 21, 2009  (JP) ................................. 2009-191819
Nov. 18, 2009  (JP) ................................. 2009-262488

(51) Int. Cl.
*B01D 37/00* (2006.01)
*C02F 9/00* (2006.01)
(Continued)

(52) U.S. Cl.
CPC .............. *C02F 9/00* (2013.01); *B01D 61/022* (2013.01); *B01D 61/145* (2013.01); *B01D 61/58* (2013.01);
(Continued)

(58) Field of Classification Search
CPC .................................................. B01D 2317/022
USPC .................................................. 210/639, 652
See application file for complete search history.

(56) References Cited

U.S. PATENT DOCUMENTS 5,651,894 A * 7/1997 Boyce et al. .................. 210/652
6,267,891 B1   7/2001 Tonelli et al.
(Continued)

FOREIGN PATENT DOCUMENTS

EP   0 397 184   11/1990
EP   1 329 425   7/2003
(Continued)

OTHER PUBLICATIONS

JP 20088161797 Machine Translation.*
(Continued)

Primary Examiner — Allison Fitzsimmons
(74) Attorney, Agent, or Firm — RatnerPrestia

(57) ABSTRACT

Provided is a fresh water production method applying a combined water-treatment technology employing a plurality of semi-permeable membrane units, the method enabling prevention of problems caused by growth of a biofilm and allowing effective use of an injected chemical agent and an injected neutralizing agent. The fresh-water production method produces fresh water by treatment of source water by a semi-permeable membrane treatment device, the concentrated water resulting from the treatment by the semi-permeable membrane treatment device is mixed with other source water, and the water mixture is treated by a second semi-permeable membrane treatment device. A first chemical agent is injected continuously or intermittently into the source water and a second chemical agent is injected continuously or intermittently into the source water.

20 Claims, 2 Drawing Sheets

(51) Int. Cl.
*B01D 61/02* (2006.01)
*B01D 61/14* (2006.01)
*B01D 61/58* (2006.01)
*B01D 65/02* (2006.01)
*C02F 1/00* (2006.01)
*C02F 1/68* (2006.01)
*C02F 1/76* (2006.01)
*C02F 1/44* (2006.01)

(52) U.S. Cl.
CPC .............. *B01D 65/02* (2013.01); *B01D 61/025* (2013.01); *B01D 61/027* (2013.01); *B01D 2321/162* (2013.01); *B01D 2321/164* (2013.01); *B01D 2321/168* (2013.01); *C02F 1/441* (2013.01); *C02F 1/442* (2013.01); *C02F 1/68* (2013.01); *C02F 1/76* (2013.01)

(56) References Cited

U.S. PATENT DOCUMENTS

| | | | | |
|---|---|---|---|---|
| 6,299,766 | B1* | 10/2001 | Permar | 210/195.2 |
| 2002/0060192 | A1* | 5/2002 | Max | 210/750 |
| 2006/0096920 | A1 | 5/2006 | Ayala et al. | |
| 2007/0138096 | A1 | 6/2007 | Tarr et al. | |
| 2011/0042306 | A1 | 2/2011 | Ito et al. | |
| 2011/0139712 | A1 | 6/2011 | Ito et al. | |
| 2011/0139716 | A1 | 6/2011 | Ito et al. | |
| 2011/0147310 | A1 | 6/2011 | Ito et al. | |
| 2011/0163036 | A1 | 7/2011 | Ito et al. | |

FOREIGN PATENT DOCUMENTS

| | | |
|---|---|---|
| EP | 2 017 228 | 1/2009 |
| JP | 09-029252 | 2/1997 |
| JP | 2001 269543 | 10/2001 |
| JP | 2004-81903 A | 3/2004 |
| JP | 2004-097911 | 4/2004 |
| JP | 2006 075667 | 3/2006 |
| JP | 2006-167533 | 6/2006 |
| JP | 2008-161797 A | 7/2008 |
| JP | 2010-184225 A | 8/2010 |
| WO | WO2010/061879 A1 | 6/2010 |
| WO | WO 2010/061879 A1 | 6/2010 |

OTHER PUBLICATIONS

Hu (2002), Membrane Separation Processes, pp. 1-32.*
European Search Report corresponding to application No. EP 10 80 9761, dated Apr. 10, 2014.
International Search Report dated Aug. 10, 2010, application No. PCT/JP2010/058524.

* cited by examiner

FRESH WATER PRODUCTION METHOD

CROSS REFERENCE TO RELATED APPLICATIONS

This application is the U.S. National Phase application of PCT International Application No. PCT/JP2010/058524, filed May 20, 2010, and claims priority to Japanese Patent Application No. 2009-191819, filed Aug. 21, 2009 and Japanese Patent Application No. 2009-262488, filed Nov. 18, 2009, the disclosures of which are each incorporated herein by reference in their entireties for all purposes.

FIELD OF THE INVENTION

The present invention relates to a fresh water production method using composite water treatment technologies, more specifically a fresh water production method for producing fresh water by a desalination technology using water (A) undergoing treatment and water (B) undergoing treatment different in osmotic pressure as multiple types of raw water.

BACKGROUND OF THE INVENTION

In recent years, the technical development of separation membranes has progressed, and owing to such features as space saving, labor saving and higher filtered water quality, the use of separation membranes is expanding in various fields including water treatment. For example, precision filtration membranes and ultrafiltration membranes are applied to the water purification processes for producing industrial water and tap water from river water, groundwater and sewage treatment water, and applied to the pretreatment in the reverse osmosis membrane treatment processes for seawater desalination and to membrane separation activated sludge processes. Nanofiltration membranes and reverse osmosis membranes are applied to ion removal, seawater desalination and wastewater reutilization processes.

In the recent situation where water shortage is acute and chronic, seawater desalination using nanofiltration membranes and reverse osmosis membranes is actively pursued. In the nanofiltration membrane/reverse osmosis membrane filtration method requiring a supply pressure higher than the osmotic pressure, a pump called "a booster pump" must be used for pressurization when raw water is supplied to nanofiltration membranes/reverse osmosis membranes. That is, if the salt concentration of raw water supplied to nanofiltration membranes/reverse osmosis membranes is higher, the osmotic pressure is higher, and therefore it is necessary to produce a higher pressure using a booster pump, and the energy for operating the booster pump is necessary.

In order to solve these problems, for example, membrane process systems in which advanced sewage treatment and seawater desalination are integrated are developed (non-patent documents 1 and 2). According to these technologies, the treatment of sewage by a membrane bioreactor is followed by the production of fresh water using reverse osmosis membranes, and further the concentrated water produced as a byproduct at the time of separation by the reverse osmosis membranes is joined with seawater. Therefore, the salt concentration of supplied seawater declines, and the pressurization by the booster pump for enforcing the reverse osmosis membrane separation for seawater desalination can be reduced. Thus, more energy-saving systems can be established.

Meanwhile, in a fresh water production system using semipermeable membranes, in general, the deposition of organic matter and turbid matter, the scale of metallic ions, the formation of the biofilm by microbial growth and the like can cause blocking on the surfaces of the semipermeable membranes and in the semipermeable membrane treatment apparatus, to bring about such troubles as the decrease in the quantity of produced fresh water and the rise of pressure. In particular, the formation of the biofilm is mainly caused by the microbes and substrate (carbon sources and nutrient salts) derived from the raw water, and the microbial growth occurs not only on the surfaces of the semipermeable membranes and in the semipermeable membrane treatment apparatus but also in the upstream piping. Accordingly troubles occur often. If the biofilm formed in a piping intermittently peels, the blocking of the channel such as the piping and tank and the abovementioned troubles of the semipermeable membrane treatment apparatus are promoted. In order to prevent such troubles, it is necessary to sterilize the semipermeable membrane treatment apparatus and the piping. Further, in the case where raw water with much organic matter such as sewage is treated by semipermeable membranes, the organic matter is deposited on the membrane surfaces, and microbes are likely to grow on the basis of the deposited organic matter. Therefore, it is necessary to wash the semipermeable membrane treatment apparatus using a chemical, for removing the organic matter.

In the case of a fresh water production system in which advanced sewage treatment and seawater desalination are integrated as described in non-patent document 1 or 2, the water obtained by treating sewage by a membrane bioreactor is treated as raw water by reverse osmosis membranes, to obtain fresh water, and the water concentrated by the reverse osmosis membranes, which is usually disposed as waste, is mixed with seawater, for further treatment by reverse osmosis membranes. In the concentrated water, the carbon sources and nutrient salts as the substrate of microbes are more concentrated than those of the biologically treated water, and consequently provide an environment where microbes are likely to grow. Thus, there is a problem that since a microbial film is formed in a concentrated water piping, the latter reverse osmosis membranes suffer troubles. Further, the aforementioned fresh water production system in which advanced sewage treatment and seawater desalination are integrated has an advantage that since the chemical used for the former reverse osmosis membranes is fed via the concentrated water piping also into the latter reverse osmosis membranes, the chemical used in the former reverse osmosis membranes can be reused also in the concentrated water piping and the latter reverse osmosis membranes. However, the chemical reused may decline in the washing/sterilization effect as the case may be, and the former reverse osmosis membranes, the concentrated water piping and the latter osmosis membranes may require respectively different optimum chemicals as the case may be. Therefore, the system has a problem that the washing/sterilization effects in the concentrated water piping and the latter reverse osmosis membranes are insufficient.

Further, it is known that a chemical such as sodium hypochlorite is added immediately after water intake also on the seawater side, but the chemical is, for example, consumed for sterilization of piping or diluted by joining/mixing with the concentrated water of the reverse osmosis membranes on the sewage side, to make the subsequent washing/sterilization effect insufficient. Furthermore, a biofilm can be formed in the mixed water piping, to block the mixed water piping, the reverse osmosis membrane treatment apparatus or the safety filter thereof. Moreover, after seawater is joined/mixed with the concentrated water of the reverse osmosis membranes on the sewage side, both the chemicals are mixed with each other or with a neutralizing agent, to pose such a problem that the washing/sterilization effect is decreased or that a harmful gas is generated. Further, in the case where a chemical is injected into the water supplied to the latter reverse osmosis membrane treatment apparatus, there is such a problem that if a chemical is newly injected though a chemical of the same type has been supplied on the upstream side, the injected amount of the chemicals of the same type becomes excessive, or that the chemical or neutralizing agent supplied on the upstream side decreases the effect of the newly injected chemical.

Further, as described in patent document 1, known is a method in which at least one chemical is added to the water supplied to reverse osmosis membranes and to the water concentrated by the reverse osmosis membranes, and the concentrated water is circulated into the water supplied, for reusing the chemical. However, this method is not applicable to a system for treating different types of raw water, and there has been no conventional method for effectively using chemicals to allow reliable washing/sterilization of piping, tanks and the like in a fresh water production system using a composite water treatment technology.

LISTING OF DOCUMENTS

Patent Document

Patent document 1: US Patent Application Publication No. 2006/0096920

Non-Patent Documents

Non-patent document 1: "Kobelco Eco-Solutions Co., Ltd., et al., "Model Project of Ministry of Economy, Trade and Industry: Demonstration Experiment in Shunan City," [online], Mar. 5, 2009, Nihon Suido Shimbun, [retrieved on Jul. 2, 2009], internet http://www.suido-gesuido.co.jp/blog/suido/2009/03/post_2780.html Non-patent document 2: "Adoption of 'Findings of Technical Series Toward Low-Carbon Society—Social System Demonstration Model Project,'" [online], Mar. 2, 2009, Toray Industries, Inc. Press Release, [retrieved on Jul. 2, 2009], internet http://www.toray.co.jp/news/water/nr090302.html

SUMMARY OF THE INVENTION

The invention provides a fresh water production method using a composite water treatment technology with multiple semipermeable membrane units disposed, as a fresh water production system capable of efficiently and effectively using injected microbicides and neutralizing agents while preventing the troubles caused by biofilm formation.

The fresh water production method of this invention includes any of the following exemplary configurations.

(1) A fresh water production method by treating water (A) undergoing treatment by a semipermeable membrane treatment apparatus (A), to produce fresh water, mixing the concentrated water (A) produced by the treatment in the semipermeable membrane treatment apparatus (A) with water (B) undergoing treatment, and treating the mixed water by a semipermeable membrane treatment apparatus (B), to produce fresh water, wherein a first chemical is continuously or intermittently injected into the water (A) undergoing treatment and a second chemical is continuously or intermittently injected into the water (B) undergoing treatment.

(2) A fresh water production method, according to (1), wherein a third chemical is continuously or intermittently injected into the aforementioned concentrated water (A) and/or a fourth chemical is continuously or intermittently injected into the aforementioned mixed water.

(3) A fresh water production method, according to (1) or (2), wherein the concentration of the aforementioned first chemical in the aforementioned concentrated water (A) as discharged from the aforementioned semipermeable membrane treatment apparatus (A) is larger than the concentration of the first chemical in the water (A) undergoing treatment as supplied to the semipermeable membrane treatment apparatus (A).

(4) A fresh water production method, according to any one of (1) through (3), wherein a first neutralizing agent with an effect of deleting or decreasing the washing effect and sterilization effect of the second chemical is continuously or intermittently injected at a position between a means for injecting the aforementioned second chemical and a water mixing means for mixing the aforementioned concentrated water (A) and the aforementioned water (B) undergoing treatment.

(5) A fresh water production method, according to (4), wherein the aforementioned first neutralizing agent has an effect of deleting or decreasing the washing effect and sterilization effect of at least one chemical selected from the aforementioned first, third and fourth chemicals.

(6) A fresh water production method, according to (5), wherein the aforementioned first neutralizing agent is intermittently injected and the first chemical is injected while the injection of the first neutralizing agent is suspended, and/or the third chemical is injected while the injection of the first neutralizing agent is suspended, and/or the fourth chemical is injected while the injection of the first neutralizing agent is suspended.

(7) A fresh water production method, according to any one of (2) through (6), wherein a second neutralizing agent with an effect of deleting or decreasing the washing effect and sterilization effect of at least one chemical selected from the aforementioned first, second and third chemicals is injected continuously or intermittently at a position between the water mixing means for mixing the aforementioned concentrated water (A) and the aforementioned water (B) undergoing treatment and a means for injecting the aforementioned fourth chemical.

(8) A fresh water production method, according to (7), wherein the aforementioned second neutralizing agent and the aforementioned fourth chemical are intermittently injected, and the fourth chemical is injected while the injection of the second neutralizing agent is suspended.

(9) A fresh water production method, according to any one of (1) through (8), wherein in the case where the aforementioned first chemical is of the type identical to that of at least one chemical selected from the aforementioned second, third and fourth chemicals, the chemical of the identical type is injected in such a manner that at least a portion of the chemical of the identical type can be mixed with the first chemical.

(10) A fresh water production method, according to any one of (2) through (8), wherein in the case where the aforementioned fourth chemical is of the type identical to that of at least one chemical selected from the aforementioned first, second and third chemicals, the chemical of the identical type is injected in such a manner that at least a portion of the chemical of the identical type can be mixed with the fourth chemical.

(11) A fresh water production method, according to any one of (1) through (8), wherein in the case where the aforementioned first chemical is of a type different from that of at least one chemical selected from the aforementioned second, third and fourth chemicals, the chemical of the different type is injected in such a manner that the chemical of the different type cannot be mixed with the first chemical.

(12) A fresh water production method, according to any one of (2) through (8), wherein in the case where the aforementioned fourth chemical is of a type different from that at least one chemical selected from the aforementioned first, second and third chemicals, the chemical of the different type is injected in such a manner that the chemical of the different type cannot be mixed with the fourth chemical.

(13) A fresh water production method, according to (10), wherein a first meter selected from a pH meter, ORP meter, chlorine concentration meter, EC meter, TOC meter, ammonia meter, TN meter and DO meter is installed between the water mixing means for mixing the aforementioned concentrated water (A) and the aforementioned water (B) undergoing treatment and the aforementioned fourth chemical injection means, wherein the injection amount of the fourth chemical is decided on the basis of the indicated value of the first meter.

(14) A fresh water production method, according to any one of (1) through (13), wherein in the case where at least one chemical selected from the aforementioned first, second, third and fourth chemicals is an acid or alkali, the ORP value of the liquid is adjusted to be kept within a specified range of values at a position upstream of the injection point of the chemical.

(15) A fresh water production method, according to (14), wherein in the case where at least one chemical selected from the aforementioned first, second, third and fourth chemicals is an acid or alkali, a first ORP meter for measuring the ORP value of the liquid, a fifth chemical injection means for continuously or intermittently injecting an oxidizing agent or reducing agent as a fifth chemical to the liquid, and a second ORP meter for measuring the ORP value of the liquid containing the fifth chemical injected therein are installed in this order from the upstream side at positions upstream of all the injection means of the acid and alkali chemicals; the start of injecting the oxidizing agent or reducing agent by the fifth chemical injection means is decided in reference to the measured value of the aforementioned first ORP meter; and the stop of the injection is decided in reference to the measured value of the aforementioned second ORP meter.

(16) A fresh water production method, according to any one of (1) through (15), wherein the ORP value of the concentrated water (A) is measured, and if the ORP value is larger than a specified value, the concentrated water (A) is discharged outside the equipment, and the semipermeable membrane treatment of the aforementioned semipermeable membrane treatment apparatus (B) is stopped.

(17) A fresh water production method, according to any one of (1) through (16), wherein the aforementioned semipermeable membrane treatment apparatus (A) is provided with chlorine-resistant semipermeable membranes, and the aforementioned first chemical is a chlorine-based chemical.

(18) A fresh water production method, according to any one of (1) through (17), wherein the aforementioned semipermeable membrane treatment apparatus (B) is provided with chlorine-resistant semipermeable membranes, and at least one chemical selected from the aforementioned second, third and fourth chemicals is a chlorine-based chemical.

(19) A fresh water production method, according to any one of (1) through (17), wherein the aforementioned second chemical is a chlorine-based chemical, and nitrogen-containing water is supplied as the aforementioned water (A) undergoing treatment, and/or a nitrogen-containing chemical is injected into the water (A) undergoing treatment or the aforementioned concentrated water (A) or the aforementioned mixed water.

DETAILED DESCRIPTION OF CERTAIN EMBODIMENTS OF THE INVENTION

Figure 1:
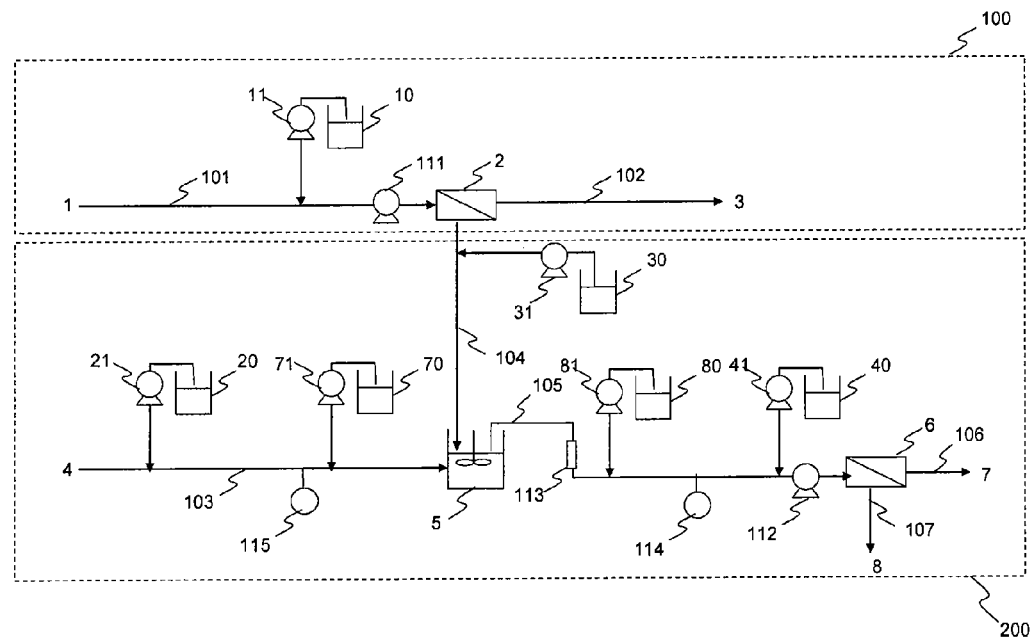
FIG. 1 is a flowchart showing an embodiment of the fresh water production system to which this invention is applied.

The effects obtained by this invention are as follows.
In one aspect of the invention, the first chemical injected into the water (A) undergoing treatment washes/sterilizes the piping for feeding the water (A) undergoing treatment to the semipermeable membrane treatment apparatus (A) and the semipermeable membrane treatment apparatus (A) and is subsequently at least partially mixed with the concentrated water (A), to wash/sterilize the piping for feeding the concentrated water (A) to a water mixing means. Further, since the concentrated water (A) containing the first chemical is mixed with the water (B) undergoing treatment, the first chemical-containing concentrated water (A) can at least partially provide the chemical necessary for washing/sterilizing the water mixing means for mixing the concentrated water (A) and the water (B) undergoing treatment and the semipermeable membrane treatment apparatus (B). Furthermore, the second chemical injected into the water (B) undergoing treatment washes/sterilizes the piping for feeding the water (B) undergoing treatment to the semipermeable membrane treatment apparatus (B), the water mixing means and the semipermeable membrane treatment apparatus (B). Since chemicals are injected at least at two upstream positions as described above, at least all the semipermeable membrane treatment apparatuses and the pipings upstream thereof contacted by the respective types of water undergoing treatment and the concentrated water likely to generate microbes are disposed to contact the chemicals. Thus, the intended washing/sterilization effect can be obtained.

In another aspect of the invention, the piping of the concentrated water (A) of the semipermeable membrane treatment apparatus (A) can be effectively washed/sterilized by continuously or intermittently injecting the third chemical. Since the concentrated water (A) is obtained by concentrating the raw water of the semipermeable membrane treatment apparatus (A), the concentrated water (A) has a high microbial substrate concentration, and consequently a biofilm is likely to be formed in the piping. Further, it is possible to enhance the washing/sterilization effect and to decrease the amounts of the chemicals used, by using different chemicals suitable for respective semipermeable membrane treatment apparatuses, pipings, etc. and making up for the losses of the chemicals in the case where they are digested by the semipermeable membrane treatment apparatuses.

Furthermore, the semipermeable membrane treatment apparatus (B) can be effectively sterilized by continuously or intermittently injecting the fourth chemical into the mixed water. The first chemical and/or the second chemical and/or the third chemical are added on the upstream side, but as the chemicals exhibit the washing/sterilization effects, the effects are gradually consumed. Therefore, as the case may be, the washing/sterilization effect may become insufficient. Moreover, the washing/sterilization effect can also be enhanced by using a chemical for a semipermeable membrane treatment apparatus different from that for a piping.

In another aspect of the invention, the washing/sterilization effect for the piping of the concentrated water (A) can be expected since the first chemical capable of maintaining the concentration of the first chemical remaining in the concentrated water (A) of the semipermeable membrane treatment apparatus (A) is combined with the semipermeable membrane treatment apparatus (A). Further, in the case where the concentrated water is diluted to X times after having been mixed with the water (B) undergoing treatment, the effect of washing/sterilizing the water mixing means and the mixed water piping can be expected if the first chemical capable of bringing the chemical concentration of the concentrated water (A) to X times the chemical concentration at the raw water inlet (primary side) of the semipermeable membrane treatment apparatus (A) is combined with the semipermeable membrane treatment apparatus (A).

Another aspect of the invention is intended to allow avoiding the case where the second chemical lowers the function of the semipermeable membrane treatment apparatus (B) and the case where the effects of the chemicals (the first chemical and/or the second chemical) supplied on the side of the concentrated water (A) of the semipermeable membrane treatment apparatus (A) are deleted or decreased.

In the case where the aforementioned first neutralizing agent has an effect of deleting or decreasing the washing/sterilization effects of the aforementioned first chemical and/or the aforementioned third chemical and/or the aforementioned fourth chemical and where the second chemical lowers the function of the semipermeable membrane treatment apparatus (B), the washing/sterilization effects of the first chemical and/or the third chemical and/or the fourth chemical can be sustained by deleting or decreasing the effect of the second chemical before the concentrated water (A) of the semipermeable membrane treatment apparatus (A) and the water (B) undergoing treatment are mixed.

In another aspect of the invention, the chance for the first neutralizing agent to contact the first chemical and/or the third chemical and/or the fourth chemical can be further decreased, and the washing/sterilization effects of the first chemical and/or the third chemical and/or the fourth chemical can be sustained by injecting the first chemical and/or the third chemical and/or the fourth chemical while the first neutralizing agent is not injected.

In another aspect of the invention, in the case where any chemical of the first, second and third chemicals decreases the function of the semipermeable membrane treatment apparatus (B), it is preferred to delete or decrease the effect of the chemical before the chemical is supplied to the semipermeable membrane treatment apparatus (B). Therefore, the second neutralizing agent can be injected to decrease the effect of the chemical before the chemical is supplied to the semipermeable membrane treatment apparatus (B), so that the function of the semipermeable membrane treatment apparatus (B) can be maintained. However, this operation alone is insufficient for washing/sterilizing the semipermeable membrane treatment apparatus (B). Consequently the semipermeable membrane treatment apparatus (B) can be washed/sterilized by injecting the fourth chemical after injecting the second neutralizing agent.

In this connection, in the case where the washing/sterilization effect of the fourth chemical is deleted or decreased by the second neutralizing agent, if the fourth chemical is injected while the injection of the second neutralizing agent is suspended as in one embodiment of the invention, it can be prevented that the effect of the fourth chemical is deleted or decreased by the second neutralizing agent remaining in the mixed water, to enhance the washing/sterilization effect of the semipermeable membrane treatment apparatus (B).

In another aspect of the invention, if a chemical of the type identical to that of the first chemical injected mainly for sterilizing the semipermeable membrane treatment apparatus (A) is used as the second chemical or the third chemical or the fourth chemical, the first chemical remaining in the concentrated water (A) of the semipermeable membrane treatment apparatus (A) can be effectively used. In general, a chemical is considered to exhibit the washing/sterilization effect thereof at a certain concentration or higher. Therefore, if the second chemical or the third chemical or the fourth chemical is additionally supplied only to such an extent that the washing/sterilization effect can be exhibited, the amount of the chemical injected can be reduced. Especially if the second chemical or the third chemical or the fourth chemical is injected when the first chemical is injected, the chemical concentration can be adjusted to the required minimum level at which the washing/sterilization effect can be exhibited.

In another aspect of the invention, if a chemical of the type identical to that of the first chemical or the second chemical or the third chemical injected on the side upstream of the injection point of the fourth chemical is used as the fourth chemical injected mainly for washing/sterilizing the semipermeable membrane treatment apparatus (B), the chemical injected on the upstream side and remaining can be effectively used. In general, a chemical is considered to exhibit the washing/sterilization effect thereof at a certain concentration or higher. Therefore, if the fourth chemical is additionally supplied only to such an extent that the washing/sterilization effect can be exhibited, the amount of the chemical injected can be reduced.

In one aspect of the invention, if a first meter selected from a pH meter, ORP meter, chlorine concentration meter, EC meter, TOC meter, ammonia meter, TN meter and DO meter is installed between the water mixing means and the fourth chemical injection point, the indicated value of the first meter is based on the concentration of the chemical of the type identical to that of the fourth chemical, and on the basis of the indicated value of the first meter, the concentration of the chemical flowing into the fourth chemical injection point is estimated to adjust the added amount of the fourth chemical, then the excess or shortage of the chemical concentration capable of exhibiting the washing/sterilization effect can be minimized. Further, if the indicated value of the first meter is based on the concentration of the neutralizing agent for neutralizing the fourth chemical and the concentration of the neutralizing agent flowing into the fourth chemical injection point is estimated on the basis of the indicated value of the first meter, to adjust the added amount of the fourth chemical and the start of fourth chemical injection, then the effect of the fourth chemical can be enhanced.

In the above, pH stands for potential hydrogen, which indicates the degree of acidity or alkalinity of a substance. A smaller pH value indicates stronger acidity, and on the contrary, a larger pH value indicates stronger alkalinity. In general, since microbes grow in a pH range from 6 to 8, the pH is often adjusted at lower than 6 or higher than 8 for microbial sterilization. Further, for membrane washing, the pH is often adjusted at 2 to 4 in acid washing and 9 to 11 in alkali washing to remove organic matter and scale. In this invention, as the pH meter for measuring the pH, any publicly known measuring instrument can be used.

ORP stands for oxidation-reduction potential, which expresses the potential generated when electrons are received and sent in an oxidation-reduction reaction. An oxidizing agent has a positive ORP value, since it takes electrons from another substance, and a reducing agent has a negative ORP value, since it gives electrons to another substance. Further, a higher positive ORP value expresses a larger oxidizing power and a lower negative ORP value expresses a larger reducing power. In general, the ORP value of free chlorine is said to be 750 mV or more and to be a strongly oxidizing agent. In this invention, as the ORP meter for measuring ORP, any publicly known measuring instrument can be used.

A chlorine concentration refers to a free chlorine concentration or the total concentration of free chlorine and bound chlorine. Free chlorine has a sterilization effect of destroying microbes at a large oxidizing power. Further, bound chlorine like chloramines has an effect corresponding to a fraction of the effect of free chlorine, but still has a relatively large sterilization effect. In this invention, as the chlorine concentration meter for measuring chlorine concentration, any publicly known measuring instrument can be used.

EC stands for electronic conductivity, which expresses the total ion concentration contained in water obtained by measuring the quantity of electricity flowing as a result of the migration of ions in the water. A higher EC means a higher ion concentration and EC can be used to measure the amount of a chemical injected. In this invention, as an EC meter for measuring EC, any publicly known measuring instrument can be used.

TOC stands for total organic carbon, which expresses the total amount of the organic matter capable of being oxidized in water, in terms of the amount of carbon. An organic acid such as citric acid is a chemical containing carbon, and therefore the amount of the chemical can be measured by measuring TOC. In this invention, as a TOC meter for measuring TOC, any publicly known measuring instrument can be used.

Ammonia is an alkali and if ammonia is combined with chlorine, chloramines are produced to provide a sterilization effect. In this invention, as an ammonia meter for measuring ammonia, any publicly known measuring instrument can be used.

TN stands for total nitrogen, which expresses the total amount of organic and inorganic (ammonia nitrogen, nitrite nitrogen and nitrate nitrogen) nitrogen compounds. The amount of a chemical containing nitrogen such as a chloramine can be measured by measuring TN. In this invention, as the TN meter for measuring TN, any publicly known measuring instrument can be used.

DO stands for dissolved oxygen. Microbes include aerobic microbes that like oxygen and anaerobic microbes that like a state free from oxygen. Aerobic microbes are inhibited if there is no DO in a liquid, and anaerobic microbes are inhibited if there is DO in a liquid. Consequently if a chemical capable of decreasing DO in a liquid, such as sodium nitrite, is injected to control DO, the generation of microbes can be inhibited. In this invention, as the DO meter for measuring DO, any publicly known measuring instrument can be used.

In another aspect of the invention, the washing/sterilization effects of the piping downstream of the first chemical injection point and the semipermeable membrane treatment apparatus (B) can be enhanced by using a chemical of a type different from that of the first chemical injected mainly for washing/sterilizing the semipermeable membrane treatment apparatus (A), as the second chemical or the third chemical or the fourth chemical. In general, in the case where only one type of chemicals is always used, microbes tolerant of the type of chemicals are likely to be generated. Therefore, by using a chemical of a type different from that of the first chemical as the second chemical or the third chemical or the fourth chemical for washing/sterilizing the piping or the semipermeable membrane treatment apparatus, the generation of microbes tolerant of the type of chemicals can be inhibited to enhance the washing/sterilization effect.

Especially by injecting the second chemical or the third chemical or the fourth chemical while the injection of the first chemical is suspended, the sterilization effect can be further enhanced. Further, in the case where the first chemical and the second chemical or the third chemical or the fourth chemical are mixed with each other to exert a negative influence, for example, to decrease the sterilization effect of either of them or to generate a harmful substance, such a negative influence can be avoided.

In another aspect of the invention, the sterilization effect of the semipermeable membrane treatment apparatus (B) can be enhanced by using a chemical of a type different from that of the first chemical or the second chemical or the third chemical injected on the side upstream of the fourth chemical injection point is used as the fourth chemical injected mainly for sterilizing the semipermeable membrane treatment apparatus (B).

Usually semipermeable membranes are weak to strong oxidizing agents such as sodium hypochlorite, chlorine dioxide and hydrogen peroxide, and therefore it is often practiced to measure the ORP value on the upstream side for injecting a reducing agent for control. On the other hand, acids and alkalis are injected in order to wash/sterilize pipings and semipermeable membrane treatment apparatuses, but acids and alkalis change the ORP value. Consequently if the ORP value of the liquid is measured before injecting an acid or alkali, the ORP value by an oxidizing agent such as remaining chlorine can be accurately identified, and if an adequate amount of a reducing agent is injected in response to the amount of chlorine or the like remaining in the liquid, the remaining chlorine can be reliably inactivated, to prevent the deterioration of the semipermeable membranes by the remaining chlorine.

In another aspect of the invention, the component capable of deteriorating the semipermeable membranes such as remaining chlorine contained in the water undergoing treatment or mixed water can be inactivated to prevent the deterioration of the semipermeable membranes, by starting the injection of the fifth chemical in the case where the value measured by the first ORP meter installed at a position upstream of the fifth chemical injection point is larger than a specified value and stopping the injection of the fifth chemical in the case where the value measured by the second ORP meter installed at a position downstream of the fifth chemical injection point falls within the range of specified values. Further, it can be prevented that a wasteful amount of a chemical is injected.

In another aspect of the invention, if concentrated water with an ORP value capable of deteriorating the semipermeable membrane treatment apparatus (B) is produced as the concentrated water (A), the deterioration of the semipermeable membrane treatment apparatus (B) can be prevented by discharging the concentrated water (A) outside the system from a valve. As a result, the amount of water supplied to the semipermeable membrane treatment apparatus (B) decreases and the osmotic pressure of the water supplied to the semipermeable membrane treatment apparatus (B) changes. Consequently, if the operation of the semipermeable membrane treatment apparatus (B) is stopped, the damage of the semipermeable membrane treatment apparatus (B) can be prevented.

In another aspect of the invention, chlorine-resistant semipermeable membranes are used in the semipermeable membrane treatment apparatus (A) so that a chlorine-based chemical such as sodium hypochlorite usually used for sterilization of pipings can be used as the first chemical, and still after it is used for washing/sterilizing the semipermeable membrane treatment apparatus (A), it can be used as it is for washing/sterilizing the piping of the concentrated water (A) of the semipermeable membrane treatment apparatus (A) and the semipermeable membrane treatment apparatus (B).

In another aspect of the invention, chlorine-resistant semipermeable membranes are used in the semipermeable membrane treatment apparatus (B) so that a chlorine-based chemical such as sodium hypochlorite usually used for sterilization of pipings can be used as the second chemical or the third chemical or the fourth chemical, and that the chlorine-based chemical used for washing the piping can be used as it is for washing/sterilizing the semipermeable membrane treatment apparatus (B).

In another aspect of the invention, the chlorine-containing liquid as the second chemical is mixed with a nitrogen component contained in the water (A) undergoing treatment or an injected nitrogen-containing chemical, to generate chloramines, the sterilization effect of the chloramines can be used to wash the semipermeable membrane treatment apparatus (B). In the case where the semipermeable membrane treatment apparatus (B) does not have resistance against a strong oxidizing agent such as free chlorine, the washing by chloramines is effective. In the case where the water (A) undergoing treatment is sewage or livestock wastewater or the like and contains a nitrogen component, the nitrogen component concentrated in the concentrated water (A) and the chlorine-containing liquid injected as the second chemical react with each other to form chloramines. If the piping for feeding the water (B) undergoing treatment or the like is washed/sterilized by free chlorine with strong washing/sterilization power, the free chlorine can be made to react with the nitrogen component inflowing from the water (A) undergoing treatment, to produce chloramines for washing/sterilizing the semipermeable membrane treatment apparatus (B). In this case, it is not necessary to neutralize the free chlorine for preventing the deterioration of the semipermeable membrane treatment apparatus (B).

Desirable modes for carrying out this invention are explained below in reference to drawings, though the scope of this invention is not limited thereto or thereby.

FIG. 1 is a flowchart showing an embodiment of the fresh water production system to which this invention is applied. This fresh water production system is provided with a semipermeable membrane treatment process (A)(100) for treating water (A)(1) undergoing treatment by a semipermeable membrane treatment apparatus (A)(2) and a semipermeable membrane treatment process (B)(200) for treating water (B)(4) undergoing treatment by a semipermeable membrane treatment apparatus (B)(6). The semipermeable membrane treatment process (A)(100) is provided with a water (A) undergoing treatment feed piping (101) for supplying the water (A)(1) to the semipermeable membrane treatment apparatus (A)(2), a booster pump (111) installed in the water (A) undergoing treatment feed piping (101), for supplying the water (A)(1) undergoing treatment to the semipermeable membrane treatment apparatus (A)(2), the semipermeable membrane treatment apparatus (A) (2) communicating with the water (A) undergoing treatment feed piping (101), a membrane-permeating water piping (102) communicating with the secondary side (membrane-permeating water side) of the semipermeable membrane treatment apparatus (A), a first chemical tank (10) for a first chemical used for washing the semipermeable membrane treatment apparatus (A)(2) and/or the water (A) undergoing treatment feed piping (101), and a first chemical feed pump (11) as a first chemical injection means for continuously or intermittently injecting the first chemical into the water (A) undergoing treatment.

Further, the semipermeable membrane treatment process (B)(200) is provided with a water (B) undergoing treatment feed piping (103) for supplying the water (B)(4) undergoing treatment to a water mixing tank (5), a concentrated water (A) feed piping (104) communicating with the primary side (water-undergoing-treatment side) of the semipermeable membrane treatment apparatus (A)(2), for supplying the concentrated water (A) to the water mixing tank (5) provided as a water mixing means, the water mixing tank (5) communicating with the water (B) undergoing treatment feed piping (103) and the concentrated water (A) feed piping (104), for mixing the water (B)(4) undergoing treatment and the concentrated water (A), to obtain mixed water, a mixed water feed piping (105) for supplying the mixed water to the semipermeable membrane treatment apparatus (B)(6), a booster pump (112) installed in the mixed water feed piping (105), for supplying the mixed water to the semipermeable membrane treatment apparatus (B)(6), the semipermeable membrane treatment apparatus (B)(6) communicating the mixed water feed piping (105), a membrane-permeating water piping (106) communicating with the secondary side (membrane-permeating water side) of the semipermeable membrane treatment apparatus (B)(6), a concentrated water piping (107) communicating with the primary side (water-undergoing-treatment side) of the semipermeable membrane treatment apparatus, a second chemical tank (20) for a second chemical used for washing the water (B) undergoing treatment feed piping (103), and a second chemical feed pump (21) as a second chemical injection means for continuously or intermittently injecting the second chemical into the water (B) undergoing treatment.

In the above, it is preferred that a third chemical injection means for continuously or intermittently injecting a third chemical into the aforementioned concentrated water (A) and/or a fourth chemical injection means for continuously or intermittently injecting a fourth chemical into the aforementioned mixed water are provided.

In the above, the water (A)(1) undergoing treatment refers to the feed water supplied to the semipermeable membrane treatment apparatus (A)(2). Further, the water (A)(1) undergoing treatment is not especially limited in properties or components, and can be, for example, sewage, industrial wastewater, seawater, brine water, lake water, river water, groundwater, etc. Further, the water obtained by subjecting these types water to biological and/or physical and/or chemical pretreatment such as activated sludge treatment, pre-filtration, precision filtration membrane treatment, ultrafiltration membrane treatment, activated carbon treatment, ozone treatment and ultraviolet irradiation treatment can also be used as the water (A) undergoing treatment, for decreasing the fouling generated in the semipermeable membrane treatment apparatus (A)(2). The properties and components of the water (B)(4) undergoing treatment are also the same as those of the water (A) undergoing treatment. If the two types of raw water are combined in such a manner that the osmotic pressure of the aforementioned concentrated water (A) may be lower than the osmotic pressure of the aforementioned water (B) undergoing treatment, the osmotic pressure of the water (B) undergoing treatment can be lowered by mixing with the concentrated water (A), and the pressure rise level of the water supplied to the semipermeable membrane treatment apparatus (B) can be kept low.

In order to keep the relationship of osmotic pressures as described above, it is only required to use raw water with a low osmotic pressure as the water (A) undergoing treatment and raw water with a high osmotic pressure as the water (B) undergoing treatment. It is preferred to use water with a low salt concentration as the raw water with a low osmotic pressure and to use water with a high salt concentration as the raw water with a high osmotic pressure. The water with a low salt concentration can generally be sewage, industrial wastewater, river water or water obtained by pretreating the foregoing. Further the water with a high salt concentration can generally be seawater, salt lake water or brine water. For example, a combination consisting of the secondarily treated water obtained by treating sewage or wastewater by a membrane bioreactor as the water (A) undergoing treatment and seawater as the water (B) undergoing treatment can be employed.

Further, somewhere in the abovementioned various pipings, biochemical and/or physical and/or chemical treatment such as activated sludge treatment, pre-filtration, precision filtration membrane treatment, ultrafiltration membrane treatment, activated carbon treatment, ozone treatment or ultraviolet irradiation treatment, or an intermediate tank or the like can also be provided.

Further, the semipermeable membrane treatment apparatuses (A) and (B) are not especially limited in form or materials, if they functionally allow the permeating water to be separated from the concentrated water by the semipermeable membranes installed in each apparatus. In this case, a semipermeable membrane refers to a membrane that does not allow some components of the water undergoing treatment to permeate, and can be, for example, a semipermeable membrane that allows a solvent to permeate and does not allow solutes to permeate. Examples of the semipermeable membranes used in water treatment technology include nano filtration membranes and reverse osmosis membranes. Nano filtration membranes or reverse osmosis membranes are required to have such performance that the solutes contained in the water undergoing treatment can be decreased to such a low concentration level as to allow the remaining water to be used as regenerated water. Specifically, it is requested that the membranes have such performance that various ions of salts, mineral components, etc., for example, divalent ions such as calcium ions, magnesium ions and sulfate ions, monovalent ions such as sodium ions, potassium ions and chlorine ions, and dissolvable organic substances such as humic acid (molecular weight $M_w \geq 100,000$), fulvic acid (molecular weight $M_w=100$ to 1,000), alcohols, ethers and saccharides can be blocked. An NF membrane is defined as a reverse osmosis filtration membrane having an operation pressure of 1.5 MPa or less, a fractional molecular weight of 200 to 1,000 and a sodium chloride blocking rate of 90% or less, and a membrane that has a fractional molecular weight smaller than said range and a blocking rate higher than said range is called a reverse osmosis membrane (RO membrane). Further, a reverse osmosis membrane close to a nano filtration membrane is also called a loose reverse osmosis membrane.

Nano filtration membranes and reverse osmosis membranes are available as hollow fiber membranes and flat membranes in view of form, and both the forms can be applied in this invention. Further, to facilitate handling, a fluid separation element with hollow fiber membrane or flat membranes accommodated in a housing can also be used. With regard to the fluid separation element, in the case where flat nano filtration membranes or flat reverse osmosis membranes are used, for example, a cylindrical housing accommodating a structure in which a membrane unit containing nano filtration membranes or reverse osmosis membranes, a permeating water channel material such as tricot and a water supply channel material such as plastic are wound around a cylindrical central pipe having numerous holes therethrough is preferred. A separation membrane module in which multiple fluid separation elements, each as described above, are connected in series or in parallel to each other, is also preferred. In the fluid separation membrane, feed water is supplied from one end into the unit, and the permeating water that permeates the nano filtration membrane or reverse osmosis membrane before the feed water reaches the other end flows into the central pipe, being taken out of the central pipe at the other end. On the other hand, the feed water that does not permeate the nano filtration membranes or reverse osmosis membranes is taken out as concentrated water at the other end.

As the material of the nano filtration membranes or reverse osmosis membranes, cellulose acetate or polymer material such as cellulose-based polymer, polyamide or vinyl polymer can be used. A typical nanofiltration membrane/reverse osmosis membrane can be a cellulose acetate-based or polyamide-based asymmetric membrane or a composite membrane having a polyamide-based or polyurea-based active layer.

Further, the respective pipings such as the water (A) undergoing treatment feed piping (101), the membrane-permeating water piping (102), the water (B) undergoing treatment feed piping (103), the concentrated water (A) feed piping (104), the mixed water feed piping (105), the membrane-permeating water piping (106) and the concentrated water piping (107) are not especially limited if they are of such a material and have such a form as functionally allowing liquid transfer. However, it is preferred that the pipings are resistant against the properties of the liquid transferred, the properties of the chemicals injected and the pressures applied.

The booster pump (111) and the booster pump (112) respectively have a pressure boosting function of pressurizing the water (A) undergoing treatment and the mixed water, for feeding the liquids to the semipermeable membrane treatment apparatuses for separation. In the case where the osmotic pressure of the liquid concerned is low, it is preferred to install a supply pump for pressurizing the liquid concerned by supplying the liquid, and in the case where the osmotic pressure of the liquid concerned is high, it is preferred to install a pump for supplying the liquid concerned and a booster pump for boosting the pressure of the liquid in order to perform membrane permeation and also for supplying it to the semipermeable membrane treatment apparatus.

The water mixing means is not especially limited in method or type, if it can functionally mix the water (B) undergoing treatment and the concentrated water (A). For example, a method using the aforementioned water mixing tank (5), a method using a line mixer, a method using a feed pump or the like can be employed. For example, the water mixing tank (5) is not especially limited, if it can store mixed water and is not deteriorated by the chemical concerned, neutralizing agent, etc., and a concrete tank, fiber-reinforced plastic tank, plastic tank or the like can be used. A stirring machine can also be installed for stirring in the tank.

Further, as the chemical injection means and the neutralizing agent injection means described later, there are a method of installing a tank with a stirrer halfway in a piping so that a chemical or neutralizing agent can be injected into said tank and mixed by a stirrer, a method of injecting a chemical or neutralizing agent into a piping at a position upstream of a booster pump and mixing by the booster pump, a method of installing a line mixer for mixing, etc. Furthermore, the chemical tanks and the neutralizing agent tanks are not especially limited, if they can store the chemical or the neutralizing agent concerned and are made of a material incapable of being deteriorated by the chemical or neutralizing agent concerned. Fiber-reinforced plastic tanks, plastic tanks or the like can be used. Further, the chemical injection means and the neutralizing agent injection means described later can be of continuous injection type for continuously injecting the chemical or neutralizing agent concerned or of intermittent injection type for switching on/off using a timer or signals, etc.

Further, the first chemical is injected to mainly wash/sterilize the water (A) undergoing treatment feed piping (101) and/or the semipermeable membrane treatment tank (A)(2). The second chemical is injected to mainly wash/sterilize the water (B) undergoing treatment feed piping (103). The third chemical is injected to mainly wash/sterilize the concentrated water feed piping (104). The fourth chemical is injected to mainly wash/sterilize the semipermeable membrane treatment apparatus (B)(6). Specifically, acids such as oxalic acid, citric acid and sulfuric acid; reducing agents such as sodium bisulfite, sodium sulfite, sodium thiosulfate and oxalic acid; alkalis such as sodium hydroxide and sodium ethylenediaminetetraacetate; oxidizing agents such as sodium hypophosphite, chlorine dioxide and hydrogen peroxide; microbicides such as 2,2-dibromo-3-nitropropionamide (DBNPA) and chloramines; and other chemicals such as surfactants and scale preventives can be adequately selected for use.

However, since usually semipermeable membranes are weak to strong oxidizing agents such as sodium hypochlorite, chlorine dioxide and hydrogen peroxide, it is preferred to use microbicides other than strong oxidizing agents as the first and fourth chemicals used for mainly washing/sterilizing the semipermeable membrane treatment apparatuses, excluding the case where the chlorine-resistant chemical described later is applied. On the other hand, since these strong oxidizing agents are relatively inexpensive and have strong microbicidal power, they are suitable for sterilizing pipings, and can be used as the second and third chemicals. However, in order not to lower the performance of the downstream semipermeable membrane treatment apparatus (B), in the case where a strong oxidizing agent is used as the second chemical, it is preferred to perfectly neutralize using the first neutralizing agent and/or second neutralizing agent described later, and in the case where a strong oxidizing agent is used as the third chemical, it is preferred to perfectly neutralize using a reducing agent neutralizing agent such as sodium bisulfite as the second neutralizing agent described later.

Meanwhile, as described before, the first chemical is used to mainly wash/sterilize the water (A) undergoing treatment feed piping (101) and/or the semipermeable membrane treatment apparatus (A)(2). However, the washing/sterilization of the water (A) undergoing treatment feed piping (101) can be distinguished from the washing/sterilization of the semipermeable membrane treatment apparatus (A)(2), by at first injecting a chemical suitable for the piping washing/sterilization and threatening to lower the performance of the semipermeable membrane treatment apparatus (A)(2) such as sodium hypochlorite in order to wash/sterilize the water (A) undergoing treatment feed piping (101), neutralizing by a neutralizing agent such as sodium bisulfite as a reducing agent, and further injecting a chemical (acid, microbicide, weak oxidizing agent, cyan-based microbicide, reducing agent, or the like) unlikely to lower the performance of the semipermeable membrane treatment apparatus (A). In this case, it is preferred that the chemical suitable for piping washing/sterilization and threatening to lower the performance of the semipermeable membrane treatment apparatus (A)(2) is injected at a position upstream of the water (A) undergoing treatment feed piping (101), and subsequently that the neutralizing agent and the chemical unlikely to lower the performance of the semipermeable membrane treatment apparatus (A) are injected in this order along the downstream direction. Further, it is preferred that the neutralizing agent and the chemical unlikely to lower the performance of the semipermeable membrane treatment apparatus (A) are injected at positions immediately before the semipermeable membrane treatment apparatus (A)(2), since the water (A) undergoing treatment feed piping (101) can be sterilized in a wider range.

Further, it is preferred that the concentration of the aforementioned first chemical in the aforementioned condensed water (A) at the time of discharge from the semipermeable membrane treatment apparatus (A) is larger than the concentration of the first chemical in the aforementioned water (A) undergoing treatment at the time of supply to the semipermeable membrane treatment apparatus (A). Furthermore, in the case where the concentrated water of the semipermeable membrane treatment apparatus (A) is diluted to X times after having been mixed with the water (B) undergoing treatment, it is preferred that the first chemical capable of bringing the chemical concentration of the concentrated water of the semipermeable membrane treatment apparatus (A) to X times the chemical concentration at the raw water inlet (primary side) of the semipermeable membrane treatment apparatus (A) is combined with the semipermeable membrane treatment apparatus (A). As a specific means for achieving it, a method of using reverse osmosis membranes as the semipermeable membranes and using a microbicide with a relatively large molecular weight such as 2,2-dibromo-3-nitrilopropioneamide (DBNPA) or a method of enhancing the separation performance by adjusting pH for ionization can be used.

Further, it is preferred that a first neutralizing agent injection means for continuously or intermittently injecting a first neutralizing agent with an effect of deleting or decreasing the washing/sterilization effect of the aforementioned second chemical is installed between the aforementioned second chemical injection means and the aforementioned water mixing means. If this mode is employed, it can be avoided that the second chemical lowers the function of the semipermeable membrane treatment apparatus (B) and that the effects of the chemicals (the first chemical and/or the second chemical) supplied from the concentrated water side of the semipermeable membrane treatment apparatus (A) are deleted or decreased.

Further in the abovementioned mode, it is especially preferred that the aforementioned first neutralizing agent has an effect of deleting or decreasing the washing/sterilization effect of at least one chemical selected from the aforementioned first, third and fourth chemicals. If this mode is employed, in the case where the aforementioned first neutralizing agent has an effect of deleting or decreasing the washing/sterilization effect of the first chemical and/or the third chemical and/or the fourth chemical and where the second chemical lowers the function of the semipermeable membrane treatment apparatus (B), the effect of the second chemical is deleted or decreased before the concentrated water of the semipermeable membrane treatment apparatus (A) and the water (B) undergoing treatment are mixed, so that the washing/sterilization effect of the first chemical and/or the third chemical and/or the fourth chemical can be sustained.

Further, it is preferred that the aforementioned first neutralizing agent injection means intermittently injects the first neutralizing agent, and in addition the aforementioned first chemical injection means intermittently injects the first chemical, wherein while the injection of the first neutralizing agent by the first neutralizing agent injection means is suspended, the first chemical injection means injects the first chemical; and/or that the aforementioned third chemical injection means intermittently injects the third chemical, wherein while the injection of the first neutralizing agent by the first neutralizing agent injection means is suspended, the third chemical injection means injects the third chemical; and/or that the aforementioned fourth injection means intermittently injects the fourth chemical, wherein while the injection of the first neutralizing agent by the first neutralizing agent injection means is suspended, the fourth chemical injection means injects the fourth chemical. If this mode is employed, the chance of allowing the first neutralizing agent to contact the first chemical and/or the third chemical and/or the fourth chemical can be further decreased, and the sterilization effects of the first chemical and/or the third chemical and/or the fourth chemical can be sustained.

Further, it is preferred that the second meter (115) is installed between the aforementioned second chemical injection means and the aforementioned first neutralizing agent injection means, wherein the injection amount of the second chemical by the second chemical injection means is decided on the basis of the indicated value of the second meter (115).

In this description, the first neutralizing agent and the second neutralizing agent described later are not especially limited, if they have an effect of deleting or decreasing the washing/sterilization effects of the chemicals concerned. Specific combinations between chemicals and corresponding neutralizing agents are compiled in Table 1.

means on the basis of the indicated value of the second meter include a method in which the calculation formula for estimating the chemical concentration from the indicated value of the second meter is decided in advance; the first neutralizing agent injection amount necessary for neutralizing the second chemical is calculated from the calculation formula; and the flow rate of the first neutralizing agent feed pump is changed in order to inject the first neutralizing agent by an amount responding to the first neutralizing agent injection amount. As another method, multiple first neutralizing agent feed pumps can be prepared in advance, and the pumps to be turned on and off are decided and operated in response to the indicated value of the second meter.

Further, it is preferred that the aforementioned fourth chemical injection means is provided, and that a second neutralizing agent injection means for continuously or intermittently injecting a second neutralizing agent with an effect of deleting or decreasing the washing/sterilization effect of at least one chemical selected from the aforementioned first, second and third chemicals is installed between the aforementioned water mixing means and the fourth chemical injection means. In the case where any chemical selected from the first, second and third chemicals decreases the function of the semipermeable membrane treatment apparatus (B), if this mode is employed, the second neutralizing agent is

TABLE 1

| Type of microbicide | Examples of microbicide | Type of neutralizing agent | Examples of neutralizing agent |
| --- | --- | --- | --- |
| Acid microbicide | Oxalic acid, citric acid, sulfuric acid | Alkali neutralizing agent | Sodium hydroxide, sodium ethylenediaminetetraacetate |
| Alkali microbicide | Sodium hydroxide, sodium ethylenediaminetetraacetate | Acid neutralizing agent | Oxalic acid, citric acid, sulfuric acid |
| Strong oxidizing agent | Sodium hypochlorite, chlorine dioxide, hydrogen peroxide, ozone | Reducing agent | Sodium bisulfite, sodium sulfite, sodium thiosulfate, oxalic acid |
| Weak oxidizing agent | Chloramines | | |
| Cyan-based | 2,2-dibromo-2-nitrilopropioneamide (DBNPA) | | |
| Reducing agent | Sodium bisulfite, sodium sulfite, sodium thiosulfate, oxalic acid | Oxidizing agent | Sodium hypochlorite, chlorine dioxide, hydrogen peroxide, ozone, chloramines |

Further, if the indicated value of the second meter is based on the concentration of the chemical of the type identical to that of the second chemical, and the concentration of the chemical flowing into the first neutralizing agent injection point is estimated on the basis of the indicated value of the second meter, to adjust the injection amount of the first neutralizing agent, then the second chemical can be neutralized without excess or shortage. By this operation, the injection amount of the neutralizing agent can be minimized to prevent the excessive injection of the neutralizing agent and to prevent the negative influences (decline of semipermeable membrane performance, deletion or decrease of effects of chemicals and neutralizing agent on the downstream side, generation of harmful byproduct, etc.) on the downstream side by the otherwise excessively injected neutralizing agent. Specifically, in the case where an acid or alkali is used as the second chemical, a pH meter can be used as the second meter. Further, in the case where an oxidizing agent or reducing agent is used as the second chemical, an ORP meter can be used as the second meter. Further, in the case where chlorine-containing water is used as the second chemical, a chlorine concentration meter can also be used as the second meter.

Further, methods for deciding the injection amount of the first neutralizing agent by the first neutralizing agent injection injected to decrease the effect of the chemical concerned before the chemical concerned is supplied to the semipermeable membrane treatment apparatus (B), for allowing the function of the semipermeable membrane treatment apparatus (B) to be sustained.

Further, it is preferred that the aforementioned second neutralizing agent injection means intermittently injects the second neutralizing agent, while the aforementioned fourth chemical injection means intermittently injects the fourth chemical, wherein the fourth chemical injection means injects the fourth chemical while the injection of the second neutralizing agent by the second neutralizing agent injection means is suspended. If this mode is employed, the deletion or decrease of the fourth chemical by the second neutralizing agent remaining in the mixed water can be reduced or inhibited to enhance the washing/sterilization effect of the semipermeable membrane treatment apparatus (B).

In the case where the safety filter (113) for preventing the inflow of a turbidity component into the semipermeable membrane treatment apparatus (B) is installed in the mixed water feed piping (105), it is preferred to install the safety filter (113) between the water mixing means (water mixing tank (5)) an the second neutralizing agent injection means.

It is preferred that the first chemical is of the type identical to that of at least one chemical selected from the aforementioned second, third and fourth chemicals. If this mode is employed, the first chemical remaining in the concentrated water of the semipermeable membrane treatment apparatus (A) can be effectively used. In general, it is considered that a chemical is considered to exhibit a washing/sterilization effect at a certain concentration or higher, and therefore if the second or third or fourth chemical is additionally supplied only to such an extent that the washing/sterilization effect can be exhibited, the injection amount of the chemical can be decreased.

Further, it is preferred that the aforementioned second chemical injection means injects the second chemical while the aforementioned first chemical injection means injects the first chemical, and/or that the aforementioned third chemical injection means injects the third chemical while the aforementioned first chemical injection means injects the first chemical, and/or that the aforementioned fourth chemical injection means injects the fourth chemical while the aforementioned first chemical injection means injects the first chemical. If this mode is employed, the chemical concentrations can be adjusted to the required minimum at which the washing/sterilization effects are exhibited.

In the above, a chemical of an identical type means that a chemical of an identical chemical species is contained. For example, if the first chemical and the second chemical are acid-based chemicals, the first chemical is regarded to be of the type identical to that of the second chemical. The same applies also to alkali-based chemicals, strong oxidizing agent-based chemicals, weak oxidizing agent-based chemicals, cyan-based chemicals and reducing agent-based chemicals.

Further, it is preferred that the aforementioned fourth chemical injection means is provided, and that the fourth chemical injected by the fourth chemical injection means is of the type identical to that of at least one chemical selected from the aforementioned first, second and third chemicals. If this mode is employed, the remaining chemical injected on the upstream side can be effectively used. In general, a chemical is considered to exhibit a washing/sterilization effect at a certain concentration or higher, and therefore if the fourth chemical is additionally supplied only to such an extent that the washing/sterilization effect can be exhibited, the injection amount of the chemical can be decreased.

Further, it is preferred that the first meter (114) is installed between the aforementioned water mixing means and the aforementioned fourth chemical injection means, and that the injection amount of the fourth chemical by the fourth chemical injection means is decided on the basis of the indicated value of the first meter (114).

In the above, if the indicated value of the first meter (114) is based on the concentration of the chemical of the type identical to that of the fourth chemical, and the concentration of the chemical flowing into the fourth chemical injection point is estimated on the basis of the indicated value of the first meter (114), to adjust the added amount of the fourth chemical, then the excess or shortage of the chemical concentration capable of exhibiting the washing/sterilization effect can be minimized. Specifically when an acid or alkali is used as the chemical, a pH meter can be used as the first meter (114). Further, an oxidizing agent or reducing agent is used as the chemical, an ORP meter can be used as the first meter (114). Furthermore, if chlorine-containing water is used as the chemical, a chlorine concentration meter can also be used as the first meter (114).

Further, methods for deciding the injection amount of the fourth chemical by the fourth chemical injection means on the basis of the indicated value of the first meter (114) include a method in which a calculation formula for estimating the chemical concentration from the indicated value of the first meter (114) is decided in advance; the chemical injection amount necessary for exhibiting the washing/sterilization effect is calculated from the calculation formula; and the flow rate of the fourth chemical feed pump is changed to inject the chemical by an amount responding to the chemical injection amount. As another method, multiple fourth chemical feed pumps are prepared in advance, and the pumps to be turned on and off are decided and operated in response to the indicated value of the first meter (114).

Further, the indicated value of the first meter (114) is based on the concentration of the neutralizing agent for neutralizing the fourth chemical, and the concentration of the neutralizing agent flowing into the fourth chemical injection point can be estimated on the basis of the indicated value of the first meter (114), to adjust the added amount of the fourth chemical and the start of fourth chemical injection, for enhancing the effect of the fourth chemical. Specifically, in the case where the neutralizing agent is an acid or alkali, a pH meter can be used as the first meter (114). Further in the case where the neutralizing agent is an oxidizing agent or reducing agent, an ORP meter can be used as the first meter (114). Furthermore in the case where chlorine-containing water is used as the neutralizing agent, a chlorine concentration meter can also be used as the first meter (114).

Further, it is preferred that the first chemical is a chemical of a type different from that of at least one chemical selected from the aforementioned second, third and fourth chemicals. If this mode is employed, the washing/sterilization effects of the piping downstream of the first chemical injection point and the semipermeable membrane treatment apparatus (B) can be enhanced. In general, in the case where only one type of chemicals is always used, microbes tolerant of the type of chemicals are likely to be generated. Therefore, by using a chemical of a type different from that of the first chemical as the second chemical or the third chemical or the fourth chemical for washing/sterilizing a piping or semipermeable membrane treatment apparatus, the generation of microbes tolerant of a particular type of chemicals can be inhibited to enhance the washing/sterilization effect.

Further, it is preferred that the aforementioned second chemical injection means injects the second chemical while the aforementioned first chemical injection means does not inject the first chemical, and/or that the aforementioned third chemical injection means injects the third chemical while the aforementioned first chemical injection means does not inject the first chemical, and/or that the fourth chemical injection means injects the fourth chemical while the aforementioned first injection means does not inject the first chemical. If this mode is employed, the washing/sterilization effect can be further enhanced. Further, in the case where the first chemical and the second chemical or the third chemical or the fourth chemical are such a combination as to cause a negative influence such as decreasing the washing/sterilization effect of either of the chemicals or generating a harmful substance, when both the chemicals are mixed, the negative influence can be avoided.

In the above, a chemical of a different type means a chemical, the main component of which is of a different chemical species, that is, not the aforementioned chemical of an identical type. For example, if the first chemical is an acid while the second microbicide is a strong oxidizing agent, they are regarded to be of different types.

Further, it is preferred that the aforementioned fourth chemical injection means is provided and that the fourth chemical injected by the fourth chemical injection means is of a type different from that of at least one chemical selected from the aforementioned first, second and third chemicals. If this mode is employed, the washing/sterilization effect of the semipermeable membrane treatment apparatus (B) can be enhanced.

Further, it is preferred that the first meter (114) selected from a pH meter, ORP meter, chlorine concentration meter, EC meter, TOC meter, ammonia meter, TN meter and DO meter is installed between the aforementioned water mixing means and the aforementioned fourth chemical injection means, wherein the injection amount of the fourth chemical by the fourth chemical injection means is decided on the basis of the indicated value of the first meter (114).

In the above, if the indicated value of the first meter (114) is based on the concentration of the first chemical or the second chemical or the third chemical and it is confirmed on the basis of the indicated value of the first meter (114) that the first chemical or the second chemical or the third chemical is not contained or has a certain concentration or lower in the inflow water flowing into the fourth chemical injection point, then the injection start or injection amount of the fourth chemical can be adjusted to further enhance the washing/sterilization effect. Specifically, if the chemical is an acid or alkali, a pH meter can be used as the first meter (114). Further, if the chemical is an oxidizing agent or reducing agent, an ORP meter can be used as the first meter (114). Furthermore, if chlorine-containing water is used as the chemical, a chlorine concentration meter can also be used as the first meter (114). Furthermore, in the case where the EC of the chemical is measured to decide the injection amount, an EC meter can be used as the first meter (114). Moreover, in the case where an organic acid such as citric acid is used as the chemical, a TOC meter can be used as the first meter (114). Further, in the case where ammonia is used as the chemical, an ammonia meter can be used as the first meter (114). Furthermore, in the case where a nitrogen-containing chemical such as ammonia or chloramines is used as the chemical, a TN meter can be used as the first meter (114). Moreover, if a chemical capable of changing dissolved oxygen such as sodium nitrite is used as the chemical, a DO meter can be used as the first meter (114).

Further, if the indicated value of the first meter (114) is based on the concentration of the neutralizing agent for neutralizing the fourth chemical and the concentration of the neutralizing agent flowing into the fourth chemical injection point is estimated on the basis of the indicated value of the first meter (114), to adjust the added amount or injection start of the fourth chemical, then the effect of the fourth chemical can be enhanced. Specifically in the case where the neutralizing agent is an acid or alkali, a pH meter can be used as the first meter (114). Further, in the case where the neutralizing agent is an oxidizing agent or reducing agent, an ORP meter can be used as the first meter (114). Moreover, in the case where the neutralizing agent is chlorine-containing water, a chlorine concentration meter can also be used as the first meter (114).

Examples of the first chemical, second chemical, third chemical, fourth chemical, first neutralizing agent and second neutralizing agent satisfying the abovementioned matters are listed in Tables 2-1 to 2-15.

TABLE 2-1

| | First microbicide | Second microbicide | Third microbicide | Fourth microbicide | First neutralizing agent | Second neutralizing agent |
|---|---|---|---|---|---|---|
| 1 | Acid/alkali | Strong oxidizing agent | Strong oxidizing agent | Acid/alkali | Reducing agent | Reducing agent |
| 2 | Acid/alkali | Strong oxidizing agent | Strong oxidizing agent | Weak oxidizing agent/cyan-based | Reducing agent | Reducing agent |
| 3 | Acid/alkali | Strong oxidizing agent | Strong oxidizing agent | Reducing agent | Reducing agent | Reducing agent |
| 4 | Acid/alkali | Strong oxidizing agent | Strong oxidizing agent | Nil | Reducing agent | Reducing agent |
| 5 | Acid/alkali | Strong oxidizing agent | Strong oxidizing agent | Acid/alkali | Nil | Reducing agent |
| 6 | Acid/alkali | Strong oxidizing agent | Strong oxidizing agent | Weak oxidizing agent/cyan-based | Nil | Reducing agent |
| 7 | Acid/alkali | Strong oxidizing agent | Strong oxidizing agent | Reducing agent | Nil | Reducing agent |
| 8 | Acid/alkali | Strong oxidizing agent | Strong oxidizing agent | Nil | Nil | Reducing agent |
| 9 | Acid/alkali | Strong oxidizing agent | Acid/alkali | Acid/alkali | Nil | Nil |
| 10 | Acid/alkali | Strong oxidizing agent | Acid/alkali | Weak oxidizing agent/cyan-based | Nil | Nil |
| 11 | Acid/alkali | Strong oxidizing agent | Acid/alkali | Reducing agent | Nil | Nil |
| 12 | Acid/alkali | Strong oxidizing agent | Acid/alkali | Nil | Nil | Nil |
| 13 | Acid/alkali | Strong oxidizing agent | Weak oxidizing agent/cyan-based | Acid/alkali | Nil | Nil |
| 14 | Acid/alkali | Strong oxidizing agent | Weak oxidizing agent/cyan-based | Weak oxidizing agent/cyan-based | Nil | Nil |
| 15 | Acid/alkali | Strong oxidizing agent | Weak oxidizing agent/cyan-based | Reducing agent | Nil | Nil |
| 16 | Acid/alkali | Strong oxidizing agent | Weak oxidizing agent/cyan-based | Nil | Nil | Nil |
| 17 | Acid/alkali | Strong oxidizing agent | Reducing agent | Acid/alkali | Nil | Nil |

TABLE 2-1-continued

|  | First microbicide | Second microbicide | Third microbicide | Fourth microbicide | First neutralizing agent | Second neutralizing agent |
|---|---|---|---|---|---|---|
| ⑱ | Acid/alkali | Strong oxidizing agent | Reducing agent | Weak oxidizing agent/cyan-based | Nil | Nil |
| ⑲ | Acid/alkali | Strong oxidizing agent | Reducing agent | Reducing agent | Nil | Nil |
| ⑳ | Acid/alkali | Strong oxidizing agent | Reducing agent | Nil | Nil | Nil |

TABLE 2-2

|  | First microbicide | Second microbicide | Third microbicide | Fourth microbicide | First neutralizing agent | Second neutralizing agent |
|---|---|---|---|---|---|---|
| ① | Acid/alkali | Nil | Strong oxidizing agent | Acid/alkali | Reducing agent | Nil |
| ② | Acid/alkali | Nil | Strong oxidizing agent | Weak oxidizing agent/cyan-based | Reducing agent | Nil |
| ③ | Acid/alkali | Nil | Strong oxidizing agent | Reducing agent | Reducing agent | Nil |
| ④ | Acid/alkali | Nil | Strong oxidizing agent | Nil | Reducing agent | Nil |
| ⑤ | Acid/alkali | Nil | Strong oxidizing agent | Acid/alkali | Nil | Reducing agent |
| ⑥ | Acid/alkali | Nil | Strong oxidizing agent | Weak oxidizing agent/cyan-based | Nil | Reducing agent |
| ⑦ | Acid/alkali | Nil | Strong oxidizing agent | Reducing agent | Nil | Reducing agent |
| ⑧ | Acid/alkali | Nil | Strong oxidizing agent | Nil | Nil | Reducing agent |
| ⑨ | Acid/alkali | Nil | Acid/alkali | Acid/alkali | Nil | Nil |
| ⑩ | Acid/alkali | Nil | Acid/alkali | Weak oxidizing agent/cyan-based | Nil | Nil |
| ⑪ | Acid/alkali | Nil | Acid/alkali | Reducing agent | Nil | Nil |
| ⑫ | Acid/alkali | Nil | Acid/alkali | Nil | Nil | Nil |
| ⑬ | Acid/alkali | Nil | Weak oxidizing agent/cyan-based | Acid/alkali | Nil | Nil |
| ⑭ | Acid/alkali | Nil | Weak oxidizing agent/cyan-based | Weak oxidizing agent/cyan-based | Nil | Nil |
| ⑮ | Acid/alkali | Nil | Weak oxidizing agent/cyan-based | Reducing agent | Nil | Nil |
| ⑯ | Acid/alkali | Nil | Weak oxidizing agent/cyan-based | Nil | Nil | Nil |
| ⑰ | Acid/alkali | Nil | Reducing agent | Acid/alkali | Nil | Nil |
| ⑱ | Acid/alkali | Nil | Reducing agent | Weak oxidizing agent/cyan-based | Nil | Nil |
| ⑲ | Acid/alkali | Nil | Reducing agent | Reducing agent | Nil | Nil |
| ⑳ | Acid/alkali | Nil | Reducing agent | Nil | Nil | Nil |

TABLE 2-3

|  | First microbicide | Second microbicide | Third microbicide | Fourth microbicide | First neutralizing agent | Second neutralizing agent |
|---|---|---|---|---|---|---|
| ① | Acid/alkali | Acid/alkali | Strong oxidizing agent | Acid/alkali | Reducing agent | Reducing agent |
| ② | Acid/alkali | Acid/alkali | Strong oxidizing agent | Weak oxidizing agent/cyan-based | Reducing agent | Reducing agent |
| ③ | Acid/alkali | Acid/alkali | Strong oxidizing agent | Reducing agent | Reducing agent | Reducing agent |
| ④ | Acid/alkali | Acid/alkali | Strong oxidizing agent | Nil | Reducing agent | Reducing agent |
| ⑤ | Acid/alkali | Acid/alkali | Strong oxidizing agent | Acid/alkali | Nil | Nil |
| ⑥ | Acid/alkali | Acid/alkali | Strong oxidizing agent | Weak oxidizing agent/cyan-based | Nil | Nil |
| ⑦ | Acid/alkali | Acid/alkali | Strong oxidizing agent | Reducing agent | Nil | Nil |
| ⑧ | Acid/alkali | Acid/alkali | Strong oxidizing agent | Nil | Nil | Nil |
| ⑨ | Acid/alkali | Acid/alkali | Acid/alkali | Acid/alkali | Nil | Nil |

TABLE 2-3-continued

| | First microbicide | Second microbicide | Third microbicide | Fourth microbicide | First neutralizing agent | Second neutralizing agent |
|---|---|---|---|---|---|---|
| ⑩ | Acid/alkali | Acid/alkali | Acid/alkali | Weak oxidizing agent/cyan-based | Nil | Nil |
| ⑪ | Acid/alkali | Acid/alkali | Acid/alkali | Reducing agent | Nil | Nil |
| ⑫ | Acid/alkali | Acid/alkali | Acid/alkali | Nil | Nil | Nil |
| ⑬ | Acid/alkali | Acid/alkali | Weak oxidizing agent/cyan-based | Acid/alkali | Nil | Nil |
| ⑭ | Acid/alkali | Acid/alkali | Weak oxidizing agent/cyan-based | Weak oxidizing agent/cyan-based | Nil | Nil |
| ⑮ | Acid/alkali | Acid/alkali | Weak oxidizing agent/cyan-based | Reducing agent | Nil | Nil |
| ⑯ | Acid/alkali | Acid/alkali | Weak oxidizing agent/cyan-based | Nil | Nil | Nil |
| ⑰ | Acid/alkali | Acid/alkali | Reducing agent | Acid/alkali | Nil | Nil |
| ⑱ | Acid/alkali | Acid/alkali | Reducing agent | Weak oxidizing agent/cyan-based | Nil | Nil |
| ⑲ | Acid/alkali | Acid/alkali | Reducing agent | Reducing agent | Nil | Nil |
| ⑳ | Acid/alkali | Acid/alkali | Reducing agent | Nil | Nil | Nil |

TABLE 2-4

| | First microbicide | Second microbicide | Third microbicide | Fourth microbicide | First neutralizing agent | Second neutralizing agent |
|---|---|---|---|---|---|---|
| ① | Acid/alkali | Weak oxidizing agent/cyan-based | Strong oxidizing agent | Acid/alkali | Reducing agent | Reducing agent |
| ② | Acid/alkali | Weak oxidizing agent/cyan-based | Strong oxidizing agent | Weak oxidizing agent/cyan-based | Reducing agent | Reducing agent |
| ③ | Acid/alkali | Weak oxidizing agent/cyan-based | Strong oxidizing agent | Reducing agent | Reducing agent | Reducing agent |
| ④ | Acid/alkali | Weak oxidizing agent/cyan-based | Strong oxidizing agent | Nil | Reducing agent | Reducing agent |
| ⑤ | Acid/alkali | Weak oxidizing agent/cyan-based | Strong oxidizing agent | Acid/alkali | Nil | Nil |
| ⑥ | Acid/alkali | Weak oxidizing agent/cyan-based | Strong oxidizing agent | Weak oxidizing agent/cyan-based | Nil | Nil |
| ⑦ | Acid/alkali | Weak oxidizing agent/cyan-based | Strong oxidizing agent | Reducing agent | Nil | Nil |
| ⑧ | Acid/alkali | Weak oxidizing agent/cyan-based | Strong oxidizing agent | Nil | Nil | Nil |
| ⑨ | Acid/alkali | Weak oxidizing agent/cyan-based | Acid/alkali | Acid/alkali | Nil | Nil |
| ⑩ | Acid/alkali | Weak oxidizing agent/cyan-based | Acid/alkali | Weak oxidizing agent/cyan-based | Nil | Nil |
| ⑪ | Acid/alkali | Weak oxidizing agent/cyan-based | Acid/alkali | Reducing agent | Nil | Nil |
| ⑫ | Acid/alkali | Weak oxidizing agent/cyan-based | Acid/alkali | Nil | Nil | Nil |
| ⑬ | Acid/alkali | Weak oxidizing agent/cyan-based | Weak oxidizing agent/cyan-based | Acid/alkali | Nil | Nil |
| ⑭ | Acid/alkali | Weak oxidizing agent/cyan-based | Weak oxidizing agent/cyan-based | Weak oxidizing agent/cyan-based | Nil | Nil |
| ⑮ | Acid/alkali | Weak oxidizing agent/cyan-based | Weak oxidizing agent/cyan-based | Reducing agent | Nil | Nil |
| ⑯ | Acid/alkali | Weak oxidizing agent/cyan-based | Weak oxidizing agent/cyan-based | Nil | Nil | Nil |
| ⑰ | Acid/alkali | Weak oxidizing agent/cyan-based | Reducing agent | Acid/alkali | Nil | Nil |
| ⑱ | Acid/alkali | Weak oxidizing agent/cyan-based | Reducing agent | Weak oxidizing agent/cyan-based | Nil | Nil |
| ⑲ | Acid/alkali | Weak oxidizing agent/cyan-based | Reducing agent | Reducing agent | Nil | Nil |
| ⑳ | Acid/alkali | Weak oxidizing agent/cyan-based | Reducing agent | Nil | Nil | Nil |

TABLE 2-5

| | First microbicide | Second microbicide | Third microbicide | Fourth microbicide | First neutralizing agent | Second neutralizing agent |
|---|---|---|---|---|---|---|
| ① | Acid/alkali | Reducing agent | Strong oxidizing agent | Acid/alkali | Reducing agent | Reducing agent |
| ② | Acid/alkali | Reducing agent | Strong oxidizing agent | Weak oxidizing agent/cyan-based | Reducing agent | Reducing agent |
| ③ | Acid/alkali | Reducing agent | Strong oxidizing agent | Reducing agent | Reducing agent | Reducing agent |
| ④ | Acid/alkali | Reducing agent | Strong oxidizing agent | Nil | Reducing agent | Reducing agent |
| ⑤ | Acid/alkali | Reducing agent | Strong oxidizing agent | Acid/alkali | Nil | Nil |
| ⑥ | Acid/alkali | Reducing agent | Strong oxidizing agent | Weak oxidizing agent/cyan-based | Nil | Nil |
| ⑦ | Acid/alkali | Reducing agent | Strong oxidizing agent | Reducing agent | Nil | Nil |
| ⑧ | Acid/alkali | Reducing agent | Strong oxidizing agent | Nil | Nil | Nil |
| ⑨ | Acid/alkali | Reducing agent | Acid/alkali | Acid/alkali | Nil | Nil |
| ⑩ | Acid/alkali | Reducing agent | Acid/alkali | Weak oxidizing agent/cyan-based | Nil | Nil |
| ⑪ | Acid/alkali | Reducing agent | Acid/alkali | Reducing agent | Nil | Nil |
| ⑫ | Acid/alkali | Reducing agent | Acid/alkali | Nil | Nil | Nil |
| ⑬ | Acid/alkali | Reducing agent | Weak oxidizing agent/cyan-based | Acid/alkali | Nil | Nil |
| ⑭ | Acid/alkali | Reducing agent | Weak oxidizing agent/cyan-based | Weak oxidizing agent/cyan-based | Nil | Nil |
| ⑮ | Acid/alkali | Reducing agent | Weak oxidizing agent/cyan-based | Reducing agent | Nil | Nil |
| ⑯ | Acid/alkali | Reducing agent | Weak oxidizing agent/cyan-based | Nil | Nil | Nil |
| ⑰ | Acid/alkali | Reducing agent | Reducing agent | Acid/alkali | Nil | Nil |
| ⑱ | Acid/alkali | Reducing agent | Reducing agent | Weak oxidizing agent/cyan-based | Nil | Nil |
| ⑲ | Acid/alkali | Reducing agent | Reducing agent | Reducing agent | Nil | Nil |
| ⑳ | Acid/alkali | Reducing agent | Reducing agent | Nil | Nil | Nil |

TABLE 2-6

| | First microbicide | Second microbicide | Third microbicide | Fourth microbicide | First neutralizing agent | Second neutralizing agent |
|---|---|---|---|---|---|---|
| ① | Weak oxidizing agent/cyan-based | Strong oxidizing agent | Strong oxidizing agent | Acid/alkali | Reducing agent | Reducing agent |
| ② | Weak oxidizing agent/cyan-based | Strong oxidizing agent | Strong oxidizing agent | Weak oxidizing agent/cyan-based | Reducing agent | Reducing agent |
| ③ | Weak oxidizing agent/cyan-based | Strong oxidizing agent | Strong oxidizing agent | Reducing agent | Reducing agent | Reducing agent |
| ④ | Weak oxidizing agent/cyan-based | Strong oxidizing agent | Strong oxidizing agent | Nil | Reducing agent | Reducing agent |
| ⑤ | Weak oxidizing agent/cyan-based | Strong oxidizing agent | Strong oxidizing agent | Acid/alkali | Nil | Reducing agent |
| ⑥ | Weak oxidizing agent/cyan-based | Strong oxidizing agent | Strong oxidizing agent | Weak oxidizing agent/cyan-based | Nil | Reducing agent |
| ⑦ | Weak oxidizing agent/cyan-based | Strong oxidizing agent | Strong oxidizing agent | Reducing agent | Nil | Reducing agent |
| ⑧ | Weak oxidizing agent/cyan-based | Strong oxidizing agent | Strong oxidizing agent | Nil | Nil | Reducing agent |
| ⑨ | Weak oxidizing agent/cyan-based | Strong oxidizing agent | Acid/alkali | Acid/alkali | Nil | Nil |
| ⑩ | Weak oxidizing agent/cyan-based | Strong oxidizing agent | Acid/alkali | Weak oxidizing agent/cyan-based | Nil | Nil |
| ⑪ | Weak oxidizing agent/cyan-based | Strong oxidizing agent | Acid/alkali | Reducing agent | Nil | Nil |
| ⑫ | Weak oxidizing agent/cyan-based | Strong oxidizing agent | Acid/alkali | Nil | Nil | Nil |
| ⑬ | Weak oxidizing agent/cyan-based | Strong oxidizing agent | Weak oxidizing agent/cyan-based | Acid/alkali | Nil | Nil |
| ⑭ | Weak oxidizing agent/cyan-based | Strong oxidizing agent | Weak oxidizing agent/cyan-based | Weak oxidizing agent/cyan-based | Nil | Nil |
| ⑮ | Weak oxidizing agent/cyan-based | Strong oxidizing agent | Weak oxidizing agent/cyan-based | Reducing agent | Nil | Nil |

TABLE 2-6-continued

| | First microbicide | Second microbicide | Third microbicide | Fourth microbicide | First neutralizing agent | Second neutralizing agent |
|---|---|---|---|---|---|---|
| ⑯ | Weak oxidizing agent/cyan-based | Strong oxidizing agent | Weak oxidizing agent/cyan-based | Nil | Nil | Nil |
| ⑰ | Weak oxidizing agent/cyan-based | Strong oxidizing agent | Reducing agent | Acid/alkali | Nil | Nil |
| ⑱ | Weak oxidizing agent/cyan-based | Strong oxidizing agent | Reducing agent | Weak oxidizing agent/cyan-based | Nil | Nil |
| ⑲ | Weak oxidizing agent/cyan-based | Strong oxidizing agent | Reducing agent | Reducing agent | Nil | Nil |
| ⑳ | Weak oxidizing agent/cyan-based | Strong oxidizing agent | Reducing agent | Nil | Nil | Nil |

TABLE 2-7

| | First microbicide | Second microbicide | Third microbicide | Fourth microbicide | First neutralizing agent | Second neutralizing agent |
|---|---|---|---|---|---|---|
| ① | Weak oxidizing agent/cyan-based | Nil | Strong oxidizing agent | Acid/alkali | Reducing agent | Nil |
| ② | Weak oxidizing agent/cyan-based | Nil | Strong oxidizing agent | Weak oxidizing agent/cyan-based | Reducing agent | Nil |
| ③ | Weak oxidizing agent/cyan-based | Nil | Strong oxidizing agent | Reducing agent | Reducing agent | Nil |
| ④ | Weak oxidizing agent/cyan-based | Nil | Strong oxidizing agent | Nil | Reducing agent | Nil |
| ⑤ | Weak oxidizing agent/cyan-based | Nil | Strong oxidizing agent | Acid/alkali | Nil | Reducing agent |
| ⑥ | Weak oxidizing agent/cyan-based | Nil | Strong oxidizing agent | Weak oxidizing agent/cyan-based | Nil | Reducing agent |
| ⑦ | Weak oxidizing agent/cyan-based | Nil | Strong oxidizing agent | Reducing agent | Nil | Reducing agent |
| ⑧ | Weak oxidizing agent/cyan-based | Nil | Strong oxidizing agent | Nil | Nil | Reducing agent |
| ⑨ | Weak oxidizing agent/cyan-based | Nil | Acid/alkali | Acid/alkali | Nil | Nil |
| ⑩ | Weak oxidizing agent/cyan-based | Nil | Acid/alkali | Weak oxidizing agent/cyan-based | Nil | Nil |
| ⑪ | Weak oxidizing agent/cyan-based | Nil | Acid/alkali | Reducing agent | Nil | Nil |
| ⑫ | Weak oxidizing agent/cyan-based | Nil | Acid/alkali | Nil | Nil | Nil |
| ⑬ | Weak oxidizing agent/cyan-based | Nil | Weak oxidizing agent/cyan-based | Acid/alkali | Nil | Nil |
| ⑭ | Weak oxidizing agent/cyan-based | Nil | Weak oxidizing agent/cyan-based | Weak oxidizing agent/cyan-based | Nil | Nil |
| ⑮ | Weak oxidizing agent/cyan-based | Nil | Weak oxidizing agent/cyan-based | Reducing agent | Nil | Nil |
| ⑯ | Weak oxidizing agent/cyan-based | Nil | Weak oxidizing agent/cyan-based | Nil | Nil | Nil |
| ⑰ | Weak oxidizing agent/cyan-based | Nil | Reducing agent | Acid/alkali | Nil | Nil |
| ⑱ | Weak oxidizing agent/cyan-based | Nil | Reducing agent | Weak oxidizing agent/cyan-based | Nil | Nil |
| ⑲ | Weak oxidizing agent/cyan-based | Nil | Reducing agent | Reducing agent | Nil | Nil |
| ⑳ | Weak oxidizing agent/cyan-based | Nil | Reducing agent | Nil | Nil | Nil |

TABLE 2-8

| | First microbicide | Second microbicide | Third microbicide | Fourth microbicide | First neutralizing agent | Second neutralizing agent |
|---|---|---|---|---|---|---|
| ① | Weak oxidizing agent/cyan-based | Acid/alkali | Strong oxidizing agent | Acid/alkali | Reducing agent | Reducing agent |
| ② | Weak oxidizing agent/cyan-based | Acid/alkali | Strong oxidizing agent | Weak oxidizing agent/cyan-based | Reducing agent | Reducing agent |
| ③ | Weak oxidizing agent/cyan-based | Acid/alkali | Strong oxidizing agent | Reducing agent | Reducing agent | Reducing agent |

TABLE 2-8-continued

| | First microbicide | Second microbicide | Third microbicide | Fourth microbicide | First neutralizing agent | Second neutralizing agent |
|---|---|---|---|---|---|---|
| ④ | Weak oxidizing agent/cyan-based | Acid/alkali | Strong oxidizing agent | Nil | Reducing agent | Reducing agent |
| ⑤ | Weak oxidizing agent/cyan-based | Acid/alkali | Strong oxidizing agent | Acid/alkali | Nil | Reducing agent |
| ⑥ | Weak oxidizing agent/cyan-based | Acid/alkali | Strong oxidizing agent | Weak oxidizing agent/cyan-based | Nil | Reducing agent |
| ⑦ | Weak oxidizing agent/cyan-based | Acid/alkali | Strong oxidizing agent | Reducing agent | Nil | Reducing agent |
| ⑧ | Weak oxidizing agent/cyan-based | Acid/alkali | Strong oxidizing agent | Nil | Nil | Reducing agent |
| ⑨ | Weak oxidizing agent/cyan-based | Acid/alkali | Acid/alkali | Acid/alkali | Nil | Nil |
| ⑩ | Weak oxidizing agent/cyan-based | Acid/alkali | Acid/alkali | Weak oxidizing agent/cyan-based | Nil | Nil |
| ⑪ | Weak oxidizing agent/cyan-based | Acid/alkali | Acid/alkali | Reducing agent | Nil | Nil |
| ⑫ | Weak oxidizing agent/cyan-based | Acid/alkali | Acid/alkali | Nil | Nil | Nil |
| ⑬ | Weak oxidizing agent/cyan-based | Acid/alkali | Weak oxidizing agent/cyan-based | Acid/alkali | Nil | Nil |
| ⑭ | Weak oxidizing agent/cyan-based | Acid/alkali | Weak oxidizing agent/cyan-based | Weak oxidizing agent/cyan-based | Nil | Nil |
| ⑮ | Weak oxidizing agent/cyan-based | Acid/alkali | Weak oxidizing agent/cyan-based | Reducing agent | Nil | Nil |
| ⑯ | Weak oxidizing agent/cyan-based | Acid/alkali | Weak oxidizing agent/cyan-based | Nil | Nil | Nil |
| ⑰ | Weak oxidizing agent/cyan-based | Acid/alkali | Reducing agent | Acid/alkali | Nil | Nil |
| ⑱ | Weak oxidizing agent/cyan-based | Acid/alkali | Reducing agent | Weak oxidizing agent/cyan-based | Nil | Nil |
| ⑲ | Weak oxidizing agent/cyan-based | Acid/alkali | Reducing agent | Reducing agent | Nil | Nil |
| ⑳ | Weak oxidizing agent/cyan-based | Acid/alkali | Reducing agent | Nil | Nil | Nil |

TABLE 2-9

| | First microbicide | Second microbicide | Third microbicide | Fourth microbicide | First neutralizing agent | Second neutralizing agent |
|---|---|---|---|---|---|---|
| ① | Weak oxidizing agent/cyan-based | Weak oxidizing agent/cyan-based | Strong oxidizing agent | Acid/alkali | Reducing agent | Reducing agent |
| ② | Weak oxidizing agent/cyan-based | Weak oxidizing agent/cyan-based | Strong oxidizing agent | Weak oxidizing agent/cyan-based | Reducing agent | Reducing agent |
| ③ | Weak oxidizing agent/cyan-based | Weak oxidizing agent/cyan-based | Strong oxidizing agent | Reducing agent | Reducing agent | Reducing agent |
| ④ | Weak oxidizing agent/cyan-based | Weak oxidizing agent/cyan-based | Strong oxidizing agent | Nil | Reducing agent | Reducing agent |
| ⑤ | Weak oxidizing agent/cyan-based | Weak oxidizing agent/cyan-based | Strong oxidizing agent | Acid/alkali | Nil | Reducing agent |
| ⑥ | Weak oxidizing agent/cyan-based | Weak oxidizing agent/cyan-based | Strong oxidizing agent | Weak oxidizing agent/cyan-based | Nil | Reducing agent |
| ⑦ | Weak oxidizing agent/cyan-based | Weak oxidizing agent/cyan-based | Strong oxidizing agent | Reducing agent | Nil | Reducing agent |
| ⑧ | Weak oxidizing agent/cyan-based | Weak oxidizing agent/cyan-based | Strong oxidizing agent | Nil | Nil | Reducing agent |
| ⑨ | Weak oxidizing agent/cyan-based | Weak oxidizing agent/cyan-based | Acid/alkali | Acid/alkali | Nil | Nil |
| ⑩ | Weak oxidizing agent/cyan-based | Weak oxidizing agent/cyan-based | Acid/alkali | Weak oxidizing agent/cyan-based | Nil | Nil |
| ⑪ | Weak oxidizing agent/cyan-based | Weak oxidizing agent/cyan-based | Acid/alkali | Reducing agent | Nil | Nil |
| ⑫ | Weak oxidizing agent/cyan-based | Weak oxidizing agent/cyan-based | Acid/alkali | Nil | Nil | Nil |
| ⑬ | Weak oxidizing agent/cyan-based | Weak oxidizing agent/cyan-based | Weak oxidizing agent/cyan-based | Acid/alkali | Nil | Nil |
| ⑭ | Weak oxidizing agent/cyan-based | Weak oxidizing agent/cyan-based | Weak oxidizing agent/cyan-based | Weak oxidizing agent/cyan-based | Nil | Nil |
| ⑮ | Weak oxidizing agent/cyan-based | Weak oxidizing agent/cyan-based | Weak oxidizing agent/cyan-based | Reducing agent | Nil | Nil |

TABLE 2-9-continued

| | First microbicide | Second microbicide | Third microbicide | Fourth microbicide | First neutralizing agent | Second neutralizing agent |
|---|---|---|---|---|---|---|
| ⑯ | Weak oxidizing agent/cyan-based | Weak oxidizing agent/cyan-based | Weak oxidizing agent/cyan-based | Nil | Nil | Nil |
| ⑰ | Weak oxidizing agent/cyan-based | Weak oxidizing agent/cyan-based | Reducing agent | Acid/alkali | Nil | Nil |
| ⑱ | Weak oxidizing agent/cyan-based | Weak oxidizing agent/cyan-based | Reducing agent | Weak oxidizing agent/cyan-based | Nil | Nil |
| ⑲ | Weak oxidizing agent/cyan-based | Weak oxidizing agent/cyan-based | Reducing agent | Reducing agent | Nil | Nil |
| ⑳ | Weak oxidizing agent/cyan-based | Weak oxidizing agent/cyan-based | Reducing agent | Nil | Nil | Nil |

TABLE 2-10

| | First microbicide | Second microbicide | Third microbicide | Fourth microbicide | First neutralizing agent | Second neutralizing agent |
|---|---|---|---|---|---|---|
| ① | Weak oxidizing agent/cyan-based | Reducing agent | Strong oxidizing agent | Acid/alkali | Reducing agent | Reducing agent |
| ② | Weak oxidizing agent/cyan-based | Reducing agent | Strong oxidizing agent | Weak oxidizing agent/cyan-based | Reducing agent | Reducing agent |
| ③ | Weak oxidizing agent/cyan-based | Reducing agent | Strong oxidizing agent | Reducing agent | Reducing agent | Reducing agent |
| ④ | Weak oxidizing agent/cyan-based | Reducing agent | Strong oxidizing agent | Nil | Reducing agent | Reducing agent |
| ⑤ | Weak oxidizing agent/cyan-based | Reducing agent | Strong oxidizing agent | Acid/alkali | Nil | Reducing agent |
| ⑥ | Weak oxidizing agent/cyan-based | Reducing agent | Strong oxidizing agent | Weak oxidizing agent/cyan-based | Nil | Reducing agent |
| ⑦ | Weak oxidizing agent/cyan-based | Reducing agent | Strong oxidizing agent | Reducing agent | Nil | Reducing agent |
| ⑧ | Weak oxidizing agent/cyan-based | Reducing agent | Strong oxidizing agent | Nil | Nil | Reducing agent |
| ⑨ | Weak oxidizing agent/cyan-based | Reducing agent | Acid/alkali | Acid/alkali | Nil | Nil |
| ⑩ | Weak oxidizing agent/cyan-based | Reducing agent | Acid/alkali | Weak oxidizing agent/cyan-based | Nil | Nil |
| ⑪ | Weak oxidizing agent/cyan-based | Reducing agent | Acid/alkali | Reducing agent | Nil | Nil |
| ⑫ | Weak oxidizing agent/cyan-based | Reducing agent | Acid/alkali | Nil | Nil | Nil |
| ⑬ | Weak oxidizing agent/cyan-based | Reducing agent | Weak oxidizing agent/cyan-based | Acid/alkali | Nil | Nil |
| ⑭ | Weak oxidizing agent/cyan-based | Reducing agent | Weak oxidizing agent/cyan-based | Weak oxidizing agent/cyan-based | Nil | Nil |
| ⑮ | Weak oxidizing agent/cyan-based | Reducing agent | Weak oxidizing agent/cyan-based | Reducing agent | Nil | Nil |
| ⑯ | Weak oxidizing agent/cyan-based | Reducing agent | Weak oxidizing agent/cyan-based | Nil | Nil | Nil |
| ⑰ | Weak oxidizing agent/cyan-based | Reducing agent | Reducing agent | Acid/alkali | Nil | Nil |
| ⑱ | Weak oxidizing agent/cyan-based | Reducing agent | Reducing agent | Weak oxidizing agent/cyan-based | Nil | Nil |
| ⑲ | Weak oxidizing agent/cyan-based | Reducing agent | Reducing agent | Reducing agent | Nil | Nil |
| ⑳ | Weak oxidizing agent/cyan-based | Reducing agent | Reducing agent | Nil | Nil | Nil |

TABLE 2-11

| | First microbicide | Second microbicide | Third microbicide | Fourth microbicide | First neutralizing agent | Second neutralizing agent |
|---|---|---|---|---|---|---|
| ① | Reducing agent | Strong oxidizing agent | Strong oxidizing agent | Acid/alkali | Reducing agent | Reducing agent |
| ② | Reducing agent | Strong oxidizing agent | Strong oxidizing agent | Weak oxidizing agent/cyan-based | Reducing agent | Reducing agent |
| ③ | Reducing agent | Strong oxidizing agent | Strong oxidizing agent | Reducing agent | Reducing agent | Reducing agent |
| ④ | Reducing agent | Strong oxidizing agent | Strong oxidizing agent | Nil | Reducing agent | Reducing agent |

TABLE 2-11-continued

| | First microbicide | Second microbicide | Third microbicide | Fourth microbicide | First neutralizing agent | Second neutralizing agent |
|---|---|---|---|---|---|---|
| ⑤ | Reducing agent | Strong oxidizing agent | Strong oxidizing agent | Acid/alkali | Nil | Reducing agent |
| ⑥ | Reducing agent | Strong oxidizing agent | Strong oxidizing agent | Weak oxidizing agent/cyan-based | Nil | Reducing agent |
| ⑦ | Reducing agent | Strong oxidizing agent | Strong oxidizing agent | Reducing agent | Nil | Reducing agent |
| ⑧ | Reducing agent | Strong oxidizing agent | Strong oxidizing agent | Nil | Nil | Reducing agent |
| ⑨ | Reducing agent | Strong oxidizing agent | Acid/alkali | Acid/alkali | Nil | Nil |
| ⑩ | Reducing agent | Strong oxidizing agent | Acid/alkali | Weak oxidizing agent/cyan-based | Nil | Nil |
| ⑪ | Reducing agent | Strong oxidizing agent | Acid/alkali | Reducing agent | Nil | Nil |
| ⑫ | Reducing agent | Strong oxidizing agent | Acid/alkali | Nil | Nil | Nil |
| ⑬ | Reducing agent | Strong oxidizing agent | Weak oxidizing agent/cyan-based | Acid/alkali | Nil | Nil |
| ⑭ | Reducing agent | Strong oxidizing agent | Weak oxidizing agent/cyan-based | Weak oxidizing agent/cyan-based | Nil | Nil |
| ⑮ | Reducing agent | Strong oxidizing agent | Weak oxidizing agent/cyan-based | Reducing agent | Nil | Nil |
| ⑯ | Reducing agent | Strong oxidizing agent | Weak oxidizing agent/cyan-based | Nil | Nil | Nil |
| ⑰ | Reducing agent | Strong oxidizing agent | Reducing agent | Acid/alkali | Nil | Nil |
| ⑱ | Reducing agent | Strong oxidizing agent | Reducing agent | Weak oxidizing agent/cyan-based | Nil | Nil |
| ⑲ | Reducing agent | Strong oxidizing agent | Reducing agent | Reducing agent | Nil | Nil |
| ⑳ | Reducing agent | Strong oxidizing agent | Reducing agent | Nil | Nil | Nil |

TABLE 2-12

| | First microbicide | Second microbicide | Third microbicide | Fourth microbicide | First neutralizing agent | Second neutralizing agent |
|---|---|---|---|---|---|---|
| ① | Reducing agent | Nil | Strong oxidizing agent | Acid/alkali | Reducing agent | Nil |
| ② | Reducing agent | Nil | Strong oxidizing agent | Weak oxidizing agent/cyan-based | Reducing agent | Nil |
| ③ | Reducing agent | Nil | Strong oxidizing agent | Reducing agent | Reducing agent | Nil |
| ④ | Reducing agent | Nil | Strong oxidizing agent | Nil | Reducing agent | Nil |
| ⑤ | Reducing agent | Nil | Strong oxidizing agent | Acid/alkali | Nil | Reducing agent |
| ⑥ | Reducing agent | Nil | Strong oxidizing agent | Weak oxidizing agent/cyan-based | Nil | Reducing agent |
| ⑦ | Reducing agent | Nil | Strong oxidizing agent | Reducing agent | Nil | Reducing agent |
| ⑧ | Reducing agent | Nil | Strong oxidizing agent | Nil | Nil | Reducing agent |
| ⑨ | Reducing agent | Nil | Acid/alkali | Acid/alkali | Nil | Nil |
| ⑩ | Reducing agent | Nil | Acid/alkali | Weak oxidizing agent/cyan-based | Nil | Nil |
| ⑪ | Reducing agent | Nil | Acid/alkali | Reducing agent | Nil | Nil |
| ⑫ | Reducing agent | Nil | Acid/alkali | Nil | Nil | Nil |
| ⑬ | Reducing agent | Nil | Weak oxidizing agent/cyan-based | Acid/alkali | Nil | Nil |
| ⑭ | Reducing agent | Nil | Weak oxidizing agent/cyan-based | Weak oxidizing agent/cyan-based | Nil | Nil |
| ⑮ | Reducing agent | Nil | Weak oxidizing agent/cyan-based | Reducing agent | Nil | Nil |
| ⑯ | Reducing agent | Nil | Weak oxidizing agent/cyan-based | Nil | Nil | Nil |
| ⑰ | Reducing agent | Nil | Reducing agent | Acid/alkali | Nil | Nil |
| ⑱ | Reducing agent | Nil | Reducing agent | Weak oxidizing agent/cyan-based | Nil | Nil |

TABLE 2-12-continued

| | First microbicide | Second microbicide | Third microbicide | Fourth microbicide | First neutralizing agent | Second neutralizing agent |
|---|---|---|---|---|---|---|
| ⑲ | Reducing agent | Nil | Reducing agent | Reducing agent | Nil | Nil |
| ⑳ | Reducing agent | Nil | Reducing agent | Nil | Nil | Nil |

TABLE 2-13

| | First microbicide | Second microbicide | Third microbicide | Fourth microbicide | First neutralizing agent | Second neutralizing agent |
|---|---|---|---|---|---|---|
| ① | Reducing agent | Acid/alkali | Strong oxidizing agent | Acid/alkali | Reducing agent | Reducing agent |
| ② | Reducing agent | Acid/alkali | Strong oxidizing agent | Weak oxidizing agent/cyan-based | Reducing agent | Reducing agent |
| ③ | Reducing agent | Acid/alkali | Strong oxidizing agent | Reducing agent | Reducing agent | Reducing agent |
| ④ | Reducing agent | Acid/alkali | Strong oxidizing agent | Nil | Reducing agent | Reducing agent |
| ⑤ | Reducing agent | Acid/alkali | Strong oxidizing agent | Acid/alkali | Nil | Reducing agent |
| ⑥ | Reducing agent | Acid/alkali | Strong oxidizing agent | Weak oxidizing agent/cyan-based | Nil | Reducing agent |
| ⑦ | Reducing agent | Acid/alkali | Strong oxidizing agent | Reducing agent | Nil | Reducing agent |
| ⑧ | Reducing agent | Acid/alkali | Strong oxidizing agent | Nil | Nil | Reducing agent |
| ⑨ | Reducing agent | Acid/alkali | Acid/alkali | Acid/alkali | Nil | Nil |
| ⑩ | Reducing agent | Acid/alkali | Acid/alkali | Weak oxidizing agent/cyan-based | Nil | Nil |
| ⑪ | Reducing agent | Acid/alkali | Acid/alkali | Reducing agent | Nil | Nil |
| ⑫ | Reducing agent | Acid/alkali | Acid/alkali | Nil | Nil | Nil |
| ⑬ | Reducing agent | Acid/alkali | Weak oxidizing agent/cyan-based | Acid/alkali | Nil | Nil |
| ⑭ | Reducing agent | Acid/alkali | Weak oxidizing agent/cyan-based | Weak oxidizing agent/cyan-based | Nil | Nil |
| ⑮ | Reducing agent | Acid/alkali | Weak oxidizing agent/cyan-based | Reducing agent | Nil | Nil |
| ⑯ | Reducing agent | Acid/alkali | Weak oxidizing agent/cyan-based | Nil | Nil | Nil |
| ⑰ | Reducing agent | Acid/alkali | Reducing agent | Acid/alkali | Nil | Nil |
| ⑱ | Reducing agent | Acid/alkali | Reducing agent | Weak oxidizing agent/cyan-based | Nil | Nil |
| ⑲ | Reducing agent | Acid/alkali | Reducing agent | Reducing agent | Nil | Nil |
| ⑳ | Reducing agent | Acid/alkali | Reducing agent | Nil | Nil | Nil |

TABLE 2-14

| | First microbicide | Second microbicide | Third microbicide | Fourth microbicide | First neutralizing agent | Second neutralizing agent |
|---|---|---|---|---|---|---|
| ① | Reducing agent | Weak oxidizing agent/cyan-based | Strong oxidizing agent | Acid/alkali | Reducing agent | Reducing agent |
| ② | Reducing agent | Weak oxidizing agent/cyan-based | Strong oxidizing agent | Weak oxidizing agent/cyan-based | Reducing agent | Reducing agent |
| ③ | Reducing agent | Weak oxidizing agent/cyan-based | Strong oxidizing agent | Reducing agent | Reducing agent | Reducing agent |
| ④ | Reducing agent | Weak oxidizing agent/cyan-based | Strong oxidizing agent | Nil | Reducing agent | Reducing agent |
| ⑤ | Reducing agent | Weak oxidizing agent/cyan-based | Strong oxidizing agent | Acid/alkali | Nil | Reducing agent |
| ⑥ | Reducing agent | Weak oxidizing agent/cyan-based | Strong oxidizing agent | Weak oxidizing agent/cyan-based | Nil | Reducing agent |
| ⑦ | Reducing agent | Weak oxidizing agent/cyan-based | Strong oxidizing agent | Reducing agent | Nil | Reducing agent |
| ⑧ | Reducing agent | Weak oxidizing agent/cyan-based | Strong oxidizing agent | Nil | Nil | Reducing agent |
| ⑨ | Reducing agent | Weak oxidizing agent/cyan-based | Acid/alkali | Acid/alkali | Nil | Nil |
| ⑩ | Reducing agent | Weak oxidizing agent/cyan-based | Acid/alkali | Weak oxidizing agent/cyan-based | Nil | Nil |
| ⑪ | Reducing agent | Weak oxidizing agent/cyan-based | Acid/alkali | Reducing agent | Nil | Nil |

TABLE 2-14-continued

| | First microbicide | Second microbicide | Third microbicide | Fourth microbicide | First neutralizing agent | Second neutralizing agent |
|---|---|---|---|---|---|---|
| ⑫ | Reducing agent | Weak oxidizing agent/cyan-based | Acid/alkali | Nil | Nil | Nil |
| ⑬ | Reducing agent | Weak oxidizing agent/cyan-based | Weak oxidizing agent/cyan-based | Acid/alkali | Nil | Nil |
| ⑭ | Reducing agent | Weak oxidizing agent/cyan-based | Weak oxidizing agent/cyan-based | Weak oxidizing agent/cyan-based | Nil | Nil |
| ⑮ | Reducing agent | Weak oxidizing agent/cyan-based | Weak oxidizing agent/cyan-based | Reducing agent | Nil | Nil |
| ⑯ | Reducing agent | Weak oxidizing agent/cyan-based | Weak oxidizing agent/cyan-based | Nil | Nil | Nil |
| ⑰ | Reducing agent | Weak oxidizing agent/cyan-based | Reducing agent | Acid/alkali | Nil | Nil |
| ⑱ | Reducing agent | Weak oxidizing agent/cyan-based | Reducing agent | Weak oxidizing agent/cyan-based | Nil | Nil |
| ⑲ | Reducing agent | Weak oxidizing agent/cyan-based | Reducing agent | Reducing agent | Nil | Nil |
| ⑳ | Reducing agent | Weak oxidizing agent/cyan-based | Reducing agent | Nil | Nil | Nil |

TABLE 2-15

| | First microbicide | Second microbicide | Third microbicide | Fourth microbicide | First neutralizing agent | Second neutralizing agent |
|---|---|---|---|---|---|---|
| ① | Reducing agent | Reducing agent | Strong oxidizing agent | Acid/alkali | Reducing agent | Reducing agent |
| ② | Reducing agent | Reducing agent | Strong oxidizing agent | Weak oxidizing agent/cyan-based | Reducing agent | Reducing agent |
| ③ | Reducing agent | Reducing agent | Strong oxidizing agent | Reducing agent | Reducing agent | Reducing agent |
| ④ | Reducing agent | Reducing agent | Strong oxidizing agent | Nil | Reducing agent | Reducing agent |
| ⑤ | Reducing agent | Reducing agent | Strong oxidizing agent | Acid/alkali | Nil | Reducing agent |
| ⑥ | Reducing agent | Reducing agent | Strong oxidizing agent | Weak oxidizing agent/cyan-based | Nil | Reducing agent |
| ⑦ | Reducing agent | Reducing agent | Strong oxidizing agent | Reducing agent | Nil | Reducing agent |
| ⑧ | Reducing agent | Reducing agent | Strong oxidizing agent | Nil | Nil | Reducing agent |
| ⑨ | Reducing agent | Reducing agent | Acid/alkali | Acid/alkali | Nil | Nil |
| ⑩ | Reducing agent | Reducing agent | Acid/alkali | Weak oxidizing agent/cyan-based | Nil | Nil |
| ⑪ | Reducing agent | Reducing agent | Acid/alkali | Reducing agent | Nil | Nil |
| ⑫ | Reducing agent | Reducing agent | Acid/alkali | Nil | Nil | Nil |
| ⑬ | Reducing agent | Reducing agent | Weak oxidizing agent/cyan-based | Acid/alkali | Nil | Nil |
| ⑭ | Reducing agent | Reducing agent | Weak oxidizing agent/cyan-based | Weak oxidizing agent/cyan-based | Nil | Nil |
| ⑮ | Reducing agent | Reducing agent | Weak oxidizing agent/cyan-based | Reducing agent | Nil | Nil |
| ⑯ | Reducing agent | Reducing agent | Weak oxidizing agent/cyan-based | Nil | Nil | Nil |
| ⑰ | Reducing agent | Reducing agent | Reducing agent | Acid/alkali | Nil | Nil |
| ⑱ | Reducing agent | Reducing agent | Reducing agent | Weak oxidizing agent/cyan-based | Nil | Nil |
| ⑲ | Reducing agent | Reducing agent | Reducing agent | Reducing agent | Nil | Nil |
| ⑳ | Reducing agent | Reducing agent | Reducing agent | Nil | Nil | Nil |

Figure 2:
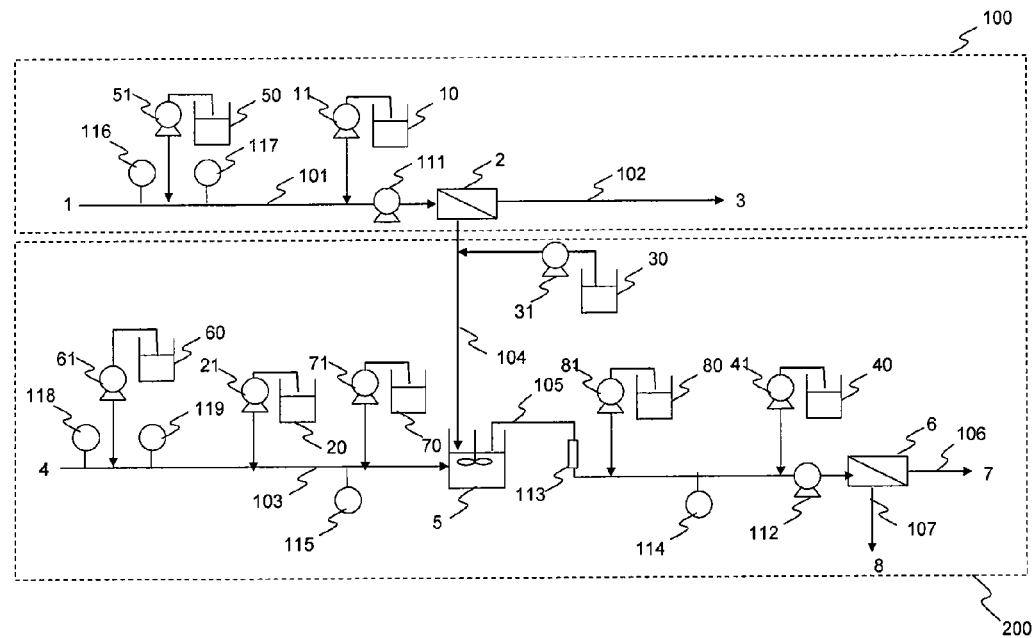
FIG. 2 is a flowchart showing another embodiment of the fresh water production system of this invention.

Further, in the case where the water (A) undergoing treatment or the water (B) undergoing treatment contains a strong oxidizing agent such as free chlorine to such an extent that the semipermeable membrane is deteriorated, it is preferred to reduce free chlorine by controlling the ORP value using a reducing agent in order not to deteriorate the semipermeable membrane treatment apparatus (A)(2) or the semipermeable membrane treatment apparatus (B)(6). However, in this case, in order that the measured value by the ORP meter is not adversely affected by an injected acid or alkali, it is preferred to use a system as shown in FIG. 2. In the case where a first chemical tank (10) or second chemical tank (20) or third chemical tank (30) or fourth chemical tank (40) contains an acid or alkali, it is preferred to reduce free chlorine on the side upstream of the place where the acid or alkali is injected in order to reliably reduce and remove the free chlorine from the water supplied to the semipermeable membrane. In the case where an acid or alkali is injected at a position upstream of the water mixing tank (5), it is preferred to reduce and remove the free chlorine from both the water (A) undergoing treatment and the water (B) undergoing treatment. Further, in the case where an acid or alkali is injected at a position downstream of the water mixing tank (5), it is preferred to remove free chlorine from the mixed water since only one chemical tank is necessary. Consequently in FIG. 2, in the case where the first chemical is an acid or alkali, in the semipermeable membrane treatment process (A)(100), a fifth chemical in a fifth chemical tank (50) is injected into the water (A) undergoing treatment by a fifth chemical feed pump (51), and further in the semipermeable membrane treatment process (B), a fifth chemical in a fifth chemical tank (60) is injected into the water (B) undergoing treatment by a fifth chemical feed pump (61).

As the method for adjusting the injection amount of the fifth chemical, a method in which an ORP meter is installed in the tank used for injecting the fifth chemical, to adjust the injection amount in order that the water in the tank may have a specified ORP value, or a method in which an ORP meter, a chemical injection point and another ORP meter are disposed in this order from the upstream side, to ensure that when the ORP meter on the side upstream of the chemical injection point indicates a value larger than a specified value, the injection of the chemical can be started and that when the ORP meter on the side downstream of the chemical injection point indicates a value within a specified range of values, the injection of the chemical is stopped, are preferred for such reasons that the free chlorine can be reliably reduced and that the free chlorine does not flow into the semipermeable membrane, hence does not deteriorate the semipermeable membrane. In FIG. 2, a first ORP meter (116) is installed at a position upstream of the injection point of the fifth chemical feed pump (51), and a second ORP meter (117) is installed at a position downstream of the injection point. Further, a first ORP meter (118) is installed at a position upstream of the injection point of the fifth chemical feed pump (61) and a second ORP meter (119) is installed at a position downstream of the injection point. In reference to the ORP values of the respective ORP meters, the injection of the fifth chemical is started and stopped. Meanwhile, it is preferred that a line mixer is installed between each fifth chemical feed pump and the ORP meter downstream of it, since the liquid and the fifth chemical can be reliably mixed.

Figure 3:
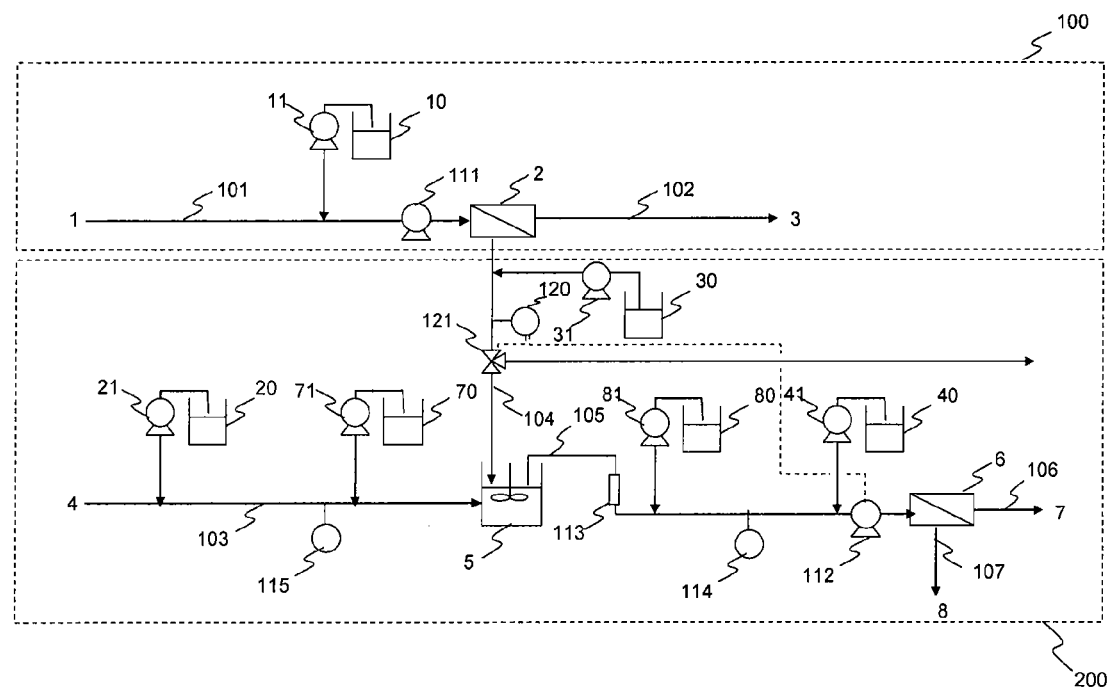
FIG. 3 is a flowchart showing a further other embodiment of the fresh water production system of this invention.

Further, since the concentrated water (A) is the water obtained by concentrating the water (A) undergoing treatment, the ORP value may become larger than a specified value, depending on the change of the water quality of the water (A) undergoing treatment. In this case, if the concentrated water (A) is mixed with the water (B) undergoing treatment, it is highly possible that the semipermeable membrane (B) is deteriorated. Therefore, it is preferred to discharge the concentrated water (A) outside the system without using it as the water supplied to the semipermeable membranes (B). For this reason, in FIG. 3 (a flowchart showing an embodiment of the fresh water production system to which the invention is applied), a third ORP meter (120) for measuring the ORP value of the concentrated water (A) is installed in the concentrated water (A) feed piping (104). In the case where the ORP value of the third ORP meter (120) becomes larger than a specified value, a three-way valve (121) is switched so that the concentrated water (A) may be switched from the water mixing tank to the drain pipe side, for being discharged outside the system. Further, lest the semipermeable membrane treatment apparatus (B)(6) should be damaged by change in the amount of the mixed water or in the osmotic pressure of the mixed water, a booster pump (112) is stopped to stop the semipermeable membrane treatment.

Further, it is preferred that the aforementioned semipermeable membrane treatment apparatus (A) is provided with chlorine-resistant semipermeable membranes, and that the first chemical is a chlorine-resistant chemical. If this mode is employed, a chlorine-based chemical such as sodium hypochlorite usually used for washing/sterilizing pipings can be used as the first chemical, and still after washing/sterilizing the semipermeable membrane treatment apparatus (A), it can be used as it is for washing/sterilizing the concentrated water piping of the semipermeable membrane treatment apparatus (A) and the semipermeable membrane treatment apparatus (B).

Further, it is preferred that the semipermeable membrane treatment (B)(6) is provided with chlorine-resistant semipermeable membranes, and that at least one chemical selected from the second, third and fourth chemicals are a chlorine-resistant chemical. If this mode is employed, the chlorine-resistant chemical having been used for washing the piping can be used as it is for washing/sterilizing the semipermeable membrane treatment apparatus (B)(6).

In the above, a chlorine-resistant semipermeable membrane refers to a semipermeable membrane that satisfies $B/A \geq 0.9$, where A denotes the sodium chloride blocking rate after the semipermeable membrane is operated in an aqueous solution containing 1,500 ppm of sodium chloride adjusted to pH 6.5 at 25° C. and at an operation pressure of 5 kg/cm$^2$ for 30 minutes, and B denotes the sodium chloride blocking rate after the same semipermeable membrane is immersed in the abovementioned sodium chloride aqueous solution further containing 100 ppm of sodium hypochlorite and adjusted by potassium dihydrogenphosphate to pH 6.5 for 48 hours and subsequently operated at an operation pressure of 5 kg/cm$^2$ for 30 minutes. The material of the membrane can be, for example, a cellulose triacetate membrane or a chlorine-resistant polyamide membrane.

Further, in the case where a chlorine-resistant chemical is used as the second chemical to be injected into the water (B) undergoing treatment, if nitrogen-containing water is supplied as the water (A) undergoing treatment or if a nitrogen-containing chemical is injected into the water (A) undergoing treatment or the concentrated water (A) or the mixed water, chlorine and ammonia nitrogen react with each other in the water mixing tank (5), to generate chloramines, and consequently the chloramines can be used to wash the semipermeable membrane treatment apparatus (B)(6). Especially in the case where the semipermeable membrane treatment apparatus (B)(6) uses polyamide-based semipermeable membranes and is deteriorated by chlorine-containing water, it is preferred to use the chloramines for inhibiting biofouling. In this case, nitrogen-containing water refers to the water obtained by biologically treating livestock wastewater, human waste, sewage or the like containing nitrogen-containing materials in water by an activated sludge method. The nitrogen-containing materials contained in the nitrogen-containing water refer to nitrogen-containing organic compounds such as ammonia nitrogen, amino acids and amines. The nitrogen-based components in the nitrogen-containing organic compounds react with chlorine, to produce chloramines.

For example, in the case where most of the nitrogen-based components contained in nitrogen-containing water are ammonia nitrogen, it reacts with chlorine according to the following reaction, to produce monochloramine.

$$NH_3 + Cl_2 \Leftrightarrow NH_2Cl + HCl \qquad \text{[Chemical formula 1]}$$

In this case, approx. 5 g of chlorine is consumed per 1 g of ammonia nitrogen, to produce approx. 3.6 g of monochloramine. In order to keep the chloramine content at an adequate level, it is preferred that the ammonia nitrogen concentration in the nitrogen-containing water is 0.003 mg/l or more. Further, it is preferred that the free chlorine concentration in the concentrated water (A) made to flow into the water mixing tank (13) is 7 mg/l or less.

To measure the chloramine concentration and the free chlorine concentration, a DPD method, current method, absorptiometry, etc. are used. The chloramine concentration can be obtained by obtaining a total chlorine concentration consisting of the chloramine concentration and the free chlorine concentration and subtracting the free chlorine concentration from the total chlorine concentration. For example, the mixed water flowing into the semipermeable membrane treatment apparatus (B)(6) is sampled, and the total chlorine concentration and the free chlorine concentration are measured under ordinary measuring conditions by a DPD method or current method. Otherwise, a continuous automatic measuring instrument using absorptiometry can be used to measure the total chlorine concentration and the free chlorine concentration. In the case where a continuous automatic measuring instrument is used for measurement, a chlorine concentration meter is attached to the mixed water feed piping (105), to perform continuous measurement for measuring the chloramine concentration in the mixed water flowing into the semipermeable membrane treatment apparatus (B)(6). By this measurement, the chloramine concentration and the free chlorine concentration are monitored to take actions for keeping the concentrations within predetermined ranges.

Further, the chlorine in water exists as free chlorine and bound chlorine. The chlorine contained in the chlorine-containing water is free chlorine, and if it reacts with a nitrogen-containing material, bound chlorine is formed. Bound chlorine refers to the chlorine existing as a chloramine(s).

A chloramine is a general term for monochloramine ($NH_2Cl$), dichloramine ($NHCl_2$) and trichloramine ($NCl_3$). Dichloramine is larger than monochloramine in microbicidal power, and trichloramine does not have microbicidal power. The production ratio of the chloramines changes, being affected by the chlorine concentration, amine compound concentration, pH, etc. Further, the microbicidal power of chloramines is approximately one tenth of that of free chlorine, and far less adversely affects the semipermeable membranes than free chlorine.

Free chlorine refers to the chlorine that exists as hypochlorous acid (HClO) and hypochlorite ions (ClO$^-$) produced when chlorine compounds react with water, and has high disinfection power and oxidizing power. Free chlorine has strong oxidizing power. Consequently if the water flowing into semipermeable membranes contains free chlorine, the semipermeable membranes will be deteriorated. Therefore, if the water flowing into RO membranes or NF membranes contains free chlorine, there occurs a problem that the membranes are deteriorated to aggravate the quality of the treated water.

Further, in order to allow the chloramines in mixed water to sufficiently exhibit a membrane sterilization effect in the semipermeable membrane treatment apparatus (B)(6), for thereby allowing biofouling to be inhibited and for preventing the functional layers of the semipermeable membranes from being deteriorated, it is preferred that the chloramine concentration in the mixed water supplied to the semipermeable membrane treatment apparatus (B)(6) is kept in a range from 0.01 to 5 mg/l. If the chloramine concentration is lower than 0.01 mg/l, biofouling cannot be inhibited. If the chloramine concentration is higher than 5 mg/l, the functional layers of the membranes are deteriorated.

This invention provides a fresh water production method using a composite water treatment technology with multiple semipermeable membrane units disposed, and can be suitably applied in the case where water (A) undergoing treatment and water (B) undergoing treatment different in osmotic pressure such as sewage and seawater as multiple types of raw water are used to produce fresh water by a desalination technology. In more detail, this invention can be applied as a fresh water production equipment in the water purification field for public water supply and in the industrial fresh water production field for producing industrial water, food and medical process water and semiconductor related washing water, and allows energy-saving efficient production of fresh water.

MEANINGS OF SYMBOLS

1: water (A) undergoing treatment
2: semipermeable membrane treatment apparatus (A)
3: membrane-permeating water (A)
4: water (B) undergoing treatment
5: water mixing tank
6: semipermeable membrane treatment apparatus (B)
7: membrane-permeating water (B)
8: concentrated water (B)
10: first chemical tank
11: first chemical feed pump
20: second chemical tank
21: second chemical feed pump
30: third chemical tank
31: third chemical feed pump
40: fourth chemical tank
41: fourth chemical feed pump
50: fifth chemical tank
51: fifth chemical feed pump
60: fifth chemical tank
61: fifth chemical feed pump
70: first neutralizing agent tank
71: first neutralizing agent feed pump
80: second neutralizing agent tank
81: second neutralizing agent feed pump
100: semipermeable membrane treatment process (A)
101: water (A) undergoing treatment feed piping
102: membrane-permeating water piping
103: water (B) undergoing treatment feed piping
104: concentrated water (A) feed piping
105: mixed water feed piping
106: membrane-permeating water piping
107: concentrated water piping
111: booster pump
112: booster pump
113: safety filter
114: first meter
115: second meter
116: first ORP meter
117: second ORP meter
118: first ORP meter
119: second ORP meter
120: third ORP meter
121: three-way valve
200: semipermeable membrane treatment process (B)

The invention claimed is:
1. A fresh water production method comprising treating a first raw water, wherein the first raw water is sewage, industrial wastewater, lake water, groundwater, river water or a treatment water obtained by subjecting sewage, industrial wastewater, lake water, groundwater or river water to pretreatment other than in accordance with the fresh water pro- duction method, using a first semipermeable membrane treatment apparatus to produce fresh water and concentrated water, mixing the concentrated water produced by the treatment in the first semipermeable membrane treatment apparatus with a second raw water, wherein the second raw water is seawater, salt lake water, brine water or a treatment water obtained by subjecting seawater, salt lake water or brine water to pre-treatment other than in accordance with the fresh water production method and has an osmotic pressure higher than the osmotic pressure of the first raw water, to produce a mixed water, and treating the mixed water using a second semipermeable membrane treatment apparatus to produce fresh water, wherein a first microbicide is continuously or intermittently injected into the first raw water and a second microbicide is continuously or intermittently injected into the second raw water and wherein a third microbicide is continuously or intermittently injected into the concentrated water and, optionally, a fourth microbicide is continuously or intermittently injected into the mixed water.

2. A fresh water production method, according to claim 1, wherein the concentration of the first microbicide in the concentrated water as discharged from the first semipermeable membrane treatment apparatus is larger than the concentration of the first microbicide in the first raw water as supplied to the first semipermeable membrane treatment apparatus.

3. A fresh water production method, according to claim 1, wherein a first neutralizing agent with an effect of eliminating or decreasing a washing effect and a sterilization effect of the second microbicide is continuously or intermittently injected at a position between a) a means for injecting the second microbicide and b) a water mixing means for mixing the concentrated water and the second raw water.

4. A fresh water production method, according to claim 3, wherein the first neutralizing agent has an effect of eliminating or decreasing a washing effect and a sterilization effect of the first microbicide.

5. A fresh water production method, according to claim 4, wherein the first neutralizing agent is intermittently injected and the first microbicide is injected while the injection of the first neutralizing agent is suspended, and/or the third microbicide is injected while the injection of the first neutralizing agent is suspended, and/or the fourth microbicide is injected while the injection of the first neutralizing agent is suspended.

6. A fresh water production method, according to claim 1, wherein a first neutralizing agent with an effect of eliminating or decreasing a washing effect and a sterilization effect of at least one microbicide selected from the first, second and third microbicides is injected continuously or intermittently at a position between the water mixing means for mixing the concentrated water and the second raw water and a means for injecting the fourth microbicide.

7. A fresh water production method, according to claim 6, wherein the second neutralizing agent and the fourth microbicide are intermittently injected, and the fourth microbicide is injected while the injection of the second neutralizing agent is suspended.

8. A fresh water production method, according to claim 1, wherein in the case where the first microbicide is of a type identical to that of the at least one microbicide selected from the second, third and fourth microbicides, the at least one microbicide selected from the second, third and fourth microbicides is injected so that at least a portion of the microbicide selected from the second, third and fourth microbicides is mixed with the first microbicide.

9. A fresh water production method, according to claim 1, wherein in the case where a fourth microbicide is continuously or intermittently injected into the mixed water and the fourth microbicide is of a type identical to that of the at least one microbicide selected from the first, second and third microbicides, the at least one microbicide selected from the first, second and third microbicides is injected so that at least a portion of the microbicide selected from the first, second and third microbicide is mixed with the fourth microbicide.

10. A fresh water production method, according to claim 1, wherein in the case where the first microbicide is of a type different from that of the second microbicide, the second microbicide is injected so that the second microbicide is not mixed with the first microbicide.

11. A fresh water production method, according to claim 1, wherein in the case where a fourth microbicide is continuously or intermittently injected into the mixed water and the fourth microbicide is of a type different from that of at least one microbicide selected from the first, second and third microbicides, the microbicide selected from the first, second and third microbicides is injected so that the microbicide selected from the first, second and third microbicides is not mixed with the fourth microbicide.

12. A fresh water production method, according to claim 9, wherein a first meter selected from the group consisting of a pH meter, ORP meter, chlorine concentration meter, EC meter, TOC meter, ammonia meter, TN meter and DO meter is installed between a water mixing means for mixing the concentrated water and the second raw water and a fourth microbicide injection means, wherein the injection amount of the fourth microbicide is determined on the basis of an indicated value of the first meter.

13. A fresh water production method, according to claim 1, wherein in the case where at least one of the first microbicide or second microbicide is an acid or alkali, the ORP value of the first raw water or second raw water into which the first microbicide or second microbicide is injected is adjusted to be kept within a specified range of values at a position upstream of an injection point of the first microbicide or second microbicide.

14. A fresh water production method, according to claim 13, wherein in the case where at least one chemical selected from the first, second, third and fourth chemicals is an acid or alkali, a first ORP meter for measuring the ORP value of the liquid, a fifth chemical injection means for continuously or intermittently injecting an oxidizing agent or reducing agent as a fifth chemical to the liquid, and a second ORP meter for measuring the ORP value of the liquid containing the fifth chemical injected therein are installed in this order from the upstream side at positions upstream of all the injection means of the acid and alkali chemicals; the start of injecting the oxidizing agent or reducing agent by the fifth chemical injection means is determined in reference to the measured value of the first ORP meter; and the stop of the injection is determined in reference to the measured value of the second ORP meter.

15. A fresh water production method, according to claim 1, wherein the ORP value of the concentrated water is measured, and if the ORP value is larger than a specified value, the concentrated water is discharged outside the equipment, and the semipermeable membrane treatment of the second semipermeable membrane treatment apparatus is stopped.

16. A fresh water production method, according to claim 1, wherein the first semipermeable membrane treatment apparatus comprises chlorine-resistant semipermeable membranes and the first microbicide is a chlorine-based microbicide.

17. A fresh water production method, according to claim 1, wherein the second semipermeable membrane treatment apparatus comprises chlorine-resistant semipermeable membranes and at least one of the first microbicide or second microbicide is a chlorine-based microbicide.

18. A fresh water production method, according to claim 1, wherein the second microbicide is a chlorine-based microbicide, and nitrogen-containing water is supplied as the first raw water, and/or a nitrogen-containing microbicide is injected into the first raw water or the concentrated water or the mixed water.

19. A fresh water production method comprising treating a first raw water, wherein the first raw water is sewage, industrial wastewater, lake water, groundwater, river water or a treatment water obtained by subjecting sewage, industrial wastewater, lake water, groundwater or river water to pre-treatment other than in accordance with the fresh water production method, using a first semipermeable membrane treatment apparatus to produce fresh water and concentrated water, mixing the concentrated water produced by the treatment in the first semipermeable membrane treatment apparatus with a second raw water, wherein the second raw water is seawater, salt lake water, brine water or a treatment water obtained by subjecting seawater, salt lake water or brine water to pre-treatment other than in accordance with the fresh water production method and has an osmotic pressure higher than the osmotic pressure of the first raw water, to produce a mixed water, and treating the mixed water using a second semipermeable membrane treatment apparatus to produce fresh water, wherein a first microbicide is continuously or intermittently injected into the first raw water and a second microbicide is continuously or intermittently injected into the second raw water, wherein the first microbicide is of a type identical to that of the second microbicide and wherein a third microbicide is continuously or intermittently injected into the concentrated water and, optionally, a fourth microbicide is continuously or intermittently injected into the mixed water.

20. A fresh water production method comprising treating a first raw water, wherein the first raw water is sewage, industrial wastewater, lake water, groundwater, river water or a treatment water obtained by subjecting sewage, industrial wastewater, lake water, groundwater or river water to pre-treatment other than in accordance with the fresh water production method, using a first semipermeable membrane treatment apparatus to produce fresh water and concentrated water, mixing the concentrated water produced by the treatment in the first semipermeable membrane treatment apparatus with a second raw water, wherein the second raw water is seawater, salt lake water, brine water or a treatment water obtained by subjecting seawater, salt lake water or brine water to pre-treatment other than in accordance with the fresh water production method and has an osmotic pressure higher than the osmotic pressure of the first raw water, to produce a mixed water, and treating the mixed water using a second semipermeable membrane treatment apparatus to produce fresh water, wherein a first microbicide is continuously or intermittently injected into the first raw water and a second microbicide is continuously or intermittently injected into the second raw water, wherein the first microbicide is of a type different from that of the second microbicide and the second microbicide is injected so that the second microbicide is not mixed with the first microbicide and wherein a third microbicide is continuously or intermittently injected into the concentrated water and, optionally, a fourth microbicide is continuously or intermittently injected into the mixed water.

* * * * *